United States Patent
Himeno et al.

(10) Patent No.: US 7,379,659 B2
(45) Date of Patent: May 27, 2008

(54) RECORDING APPARATUS AND METHOD, PLAYBACK APPARATUS AND METHOD, AND RECORDING MEDIUM THEREFOR

(75) Inventors: Takuji Himeno, Chiba (JP); Yoichiro Tauchi, Saitama (JP); Toshinori Kouzai, Kanagawa (JP); Tsukasa Hashino, Kanagawa (JP); Hidehiko Teshirogi, Kanagawa (JP); Fumiyoshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 10/848,475

(22) Filed: May 18, 2004

(65) Prior Publication Data

US 2004/0213549 A1 Oct. 28, 2004

Related U.S. Application Data

(62) Division of application No. 09/841,420, filed on Apr. 24, 2001, now Pat. No. 7,088,911.

(30) Foreign Application Priority Data

Apr. 26, 2000 (JP) ............................. 2000-125227
Apr. 26, 2000 (JP) ............................. 2000-125228
Apr. 26, 2000 (JP) ............................. 2000-125229

(51) Int. Cl.
*H04N 5/91* (2006.01)
(52) U.S. Cl. ..................... 386/105; 386/109; 386/124; 386/125
(58) Field of Classification Search ................... None
See application file for complete search history.

(56) References Cited

U.S. PATENT DOCUMENTS 5,543,932 A  8/1996  Chang et al.

(Continued)

FOREIGN PATENT DOCUMENTS

EP  1 014 732  6/2000

*Primary Examiner*—John Miller
*Assistant Examiner*—James A. Fletcher
(74) *Attorney, Agent, or Firm*—Frommer Lawrence & Haug LLP; William S. Frommer; Thomas F. Presson

(57) ABSTRACT

Audio signals and video signals are recorded as follows. Three video PES packets, each being formed of one video frame, are combined to form a video editing unit. Then, the video editing unit and the associated audio editing unit are alternately disposed on a magnetic tape. The recorded PES packets are output as a TS as follows. A STC is initialized, and then, PSI packets of a PAT and a PMT are output. TS packets specially used for a PCR for storing the STC are then output at certain intervals. Subsequently, video PES packets are converted into TSs, and the output of the video TSs is started while synchronizing a time obtained by subtracting vbv_delay from the first I-picture DTS with the STC. Audio PES packets are converted into TSs, and the output of the audio TSs is started while synchronizing a time obtained by subtracting the start up delay from the first frame with the STC. Data streams are recorded in the following manner. The three MSBs of a sync block (SB) header indicate the type of data to be recorded in the following data area. If the data type is PES-VIDEO or PES-AUDIO, a full/partial flag is recorded in the fourth MSB of the SB header. In the subsequent four LSBs, the continuity count value representing the continuity of the same type of SBs is recorded.

4 Claims, 22 Drawing Sheets

U.S. PATENT DOCUMENTS

| | | |
|---|---|---|
| 5,579,183 A | 11/1996 | Van Gestel et al. |
| 5,617,263 A | 4/1997 | Mizushima et al. |
| 5,768,298 A | 6/1998 | Nagai et al. |
| 5,940,574 A | 8/1999 | Iwamoto et al. |
| 6,008,959 A | 12/1999 | Saeijs et al. |
| 6,115,537 A | 9/2000 | Yamada et al. |
| 6,643,729 B2 * | 11/2003 | Sasaki et al. ............... 386/124 |
| 2003/0070040 A1 * | 4/2003 | Sasaki et al. ............... 711/112 |

* cited by examiner

FIG. 2

| T.S. | AUDIO 4 FRAMES | T.S. | VIDEO 3 FRAMES (I/B/B) | T.S. | AUDIO 4 FRAMES | T.S. | VIDEO 3 FRAMES (P/B/B) | T.S. | AUDIO 5 FRAMES | T.S. | VIDEO 3 FRAMES (P/B/B) |

T.S. : TIME STAMP

FIG. 3

| AUDIO PES 4 FRAMES | VIDEO PES 3 FRAMES(I/B/B) | AUDIO PES 4 FRAMES | VIDEO PES 3 FRAMES(P/B/B) | AUDIO PES 5 FRAMES | VIDEO 3 FRAMES(P/B/B) |

FIG. 7

| BIT-7 | BIT-6 | BIT-5 | BIT-4 | BIT-3 | BIT-2 | BIT-1 | BIT-0 |
|---|---|---|---|---|---|---|---|
| <--- DATA TYPE ---> | | | | | | | |
| 0 | PES-VIDEO | | FULL/PARTIAL | CONTINUITY COUNTER | | | |
| 1 | PES-AUDIO | | FULL/PARTIAL | CONTINUITY COUNTER | | | |
| 2 | SEARCH-DATA | | VIDEO/AUDIO | SEARCH SPEED | | | RESERVED |
| 3 | AUX | | AUX MODE | | | RESERVED | |
| 4 | TS-1 | | RESERVED | | TIME STAMP | | |
| 5 | TS-2 | | CONTINUITY COUNTER | | | | |
| 6 | NULL | | RESERVED | | | | |
| 7 | RESERVED | | RESERVED | | | | |

AUX MODE
0 : AUX-V
1 : AUX-A
2 : PSI-1
3 : PSI-2
4 : SYSTEM
5-7 : RESERVED

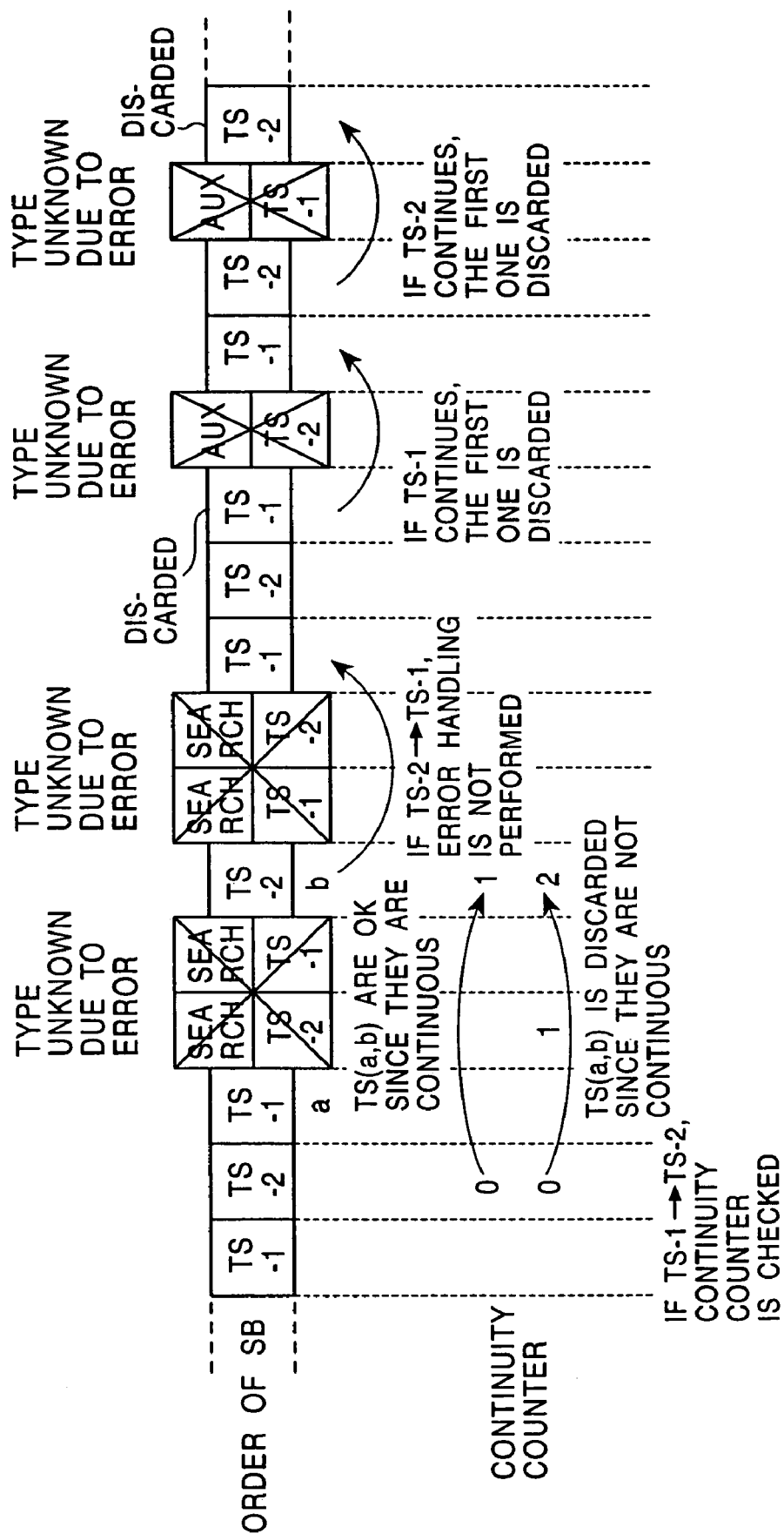

RECORDING APPARATUS AND METHOD, PLAYBACK APPARATUS AND METHOD, AND RECORDING MEDIUM THEREFOR

This application is a divisional of Ser. No. 09/841,420, filed Apr. 24, 2001 now U.S. Pat. No. 7,088,911, which application is hereby incorporated by reference.

BACKGROUND OF THE INVENTION

1. Field of the Invention

The present invention relates to recording apparatuses and methods, playback apparatuses and methods, and to recording media therefor. More particularly, the invention relates to a recording apparatus and method suitable for, for example, compressing audiovisual (AV) signals and recording them on information recording media, and to a recording medium therefor. The invention also pertains to a playback apparatus and method suitable for, for example, converting AV signals recorded on information recording media as packetized elementary stream packets into transport streams and outputting them, and to a recording medium therefor. The invention also relates to a recording apparatus and method and a playback apparatus and method suitable for, for example, recording and reading different types of data streams on and from information recording media, and to a recording medium therefor.

2. Description of the Related Art

As the DV format used for consumer video cassette recorders (VCRs), a system is provided for coding video signals by performing intra-frame compression and coding the corresponding audio signals without compressing them or coding the audio signals so that they can be instantaneously companded, and then for recording the encoded video signals and audio signals on magnetic tape.

Video signals and audio signals encoded in the DV format and recorded on recording media are suitable for editing the corresponding images and sound so that they can be spliced at a certain position.

However, because of a low compression rate of the DV format, a system having a high transfer rate and a medium having a large storage capacity are required, and also, the recording time becomes shorter if the capacity of an information recording medium is limited.

To overcome the above-described drawbacks, a system for compressing video signals and audio signals according to an Moving Picture Experts Group (MPEG) method and for recording them in the form of transport stream (hereinafter sometimes referred to as "TS") has been proposed and is used.

According to the system using the MPEG method, video signals are encoded by compressing a long group of pictures (GOP) formed of a plurality of frames according to the inter-frame compression method, while audio signals are encoded by compressing a plurality of samples according to the frame compression method, thereby achieving a high compression rate. Accordingly, the provision of a recording system having a high transfer rate becomes unnecessary, space can be saved on the recording medium, and the recording time becomes longer compared to a DV-format system even if the capacity of the recording medium is limited.

However, in a system in which MPEG-compressed video signals and audio signals are recorded in the form of TS, the following problems are presented.

That is, as stated above, video signals are MPEG-compressed in units of long GOPs, the length of one frame of an image varies according to the type of image (Intra (I) picture, Predictive (P) picture, and Bidirectionally predictive (B) picture) or the design of the image. In other words, the video signals are not compressed at a constant rate. In contrast, audio signals are compressed at a fixed rate. Accordingly, even if the video signals and the corresponding audio signals are simultaneously encoded, the packets of the video signals and the corresponding packets of the audio signals may disadvantageously be separately disposed on a TS.

In this case, if images and sound are edited so that they are spliced at a certain position on a TS, there may be temporal displacement in the continuity between video frames and audio frames, or one of the video frames or the audio frames may be missing.

It is also necessary to add to a TS a TS header, a time stamp indicating the arrival time of video signals and audio signals at a decoder, and a program clock reference (PCR) packet for storing a PCR, which is the reference time for a decoding operation. Accordingly, the overhead becomes larger, and the recording rate is lowered.

In addition, it is difficult to perform so-called "jog playback", such as pause, slow, and reverse playback, on video signals and audio signals. To enable the jog playback operation, it is necessary to convert TSs to elementary streams.

Moreover, an error may occur in a video signal or an audio signal in the form of a TS during a reading or playback operation, thereby adversely influencing the image quality or the sound quality.

SUMMARY OF THE INVENTION

Accordingly, in view of the above background, it is an object of the present invention to avoid any inconvenience caused by recording MPEG-compressed video signals and audio signals on an information recording medium as packetized elementary streams when video and audio editing is performed.

It is another object of the present invention to record MPEG-compressed video signals and audio signals as packetized elementary streams and to output them as TSs.

It is still another object of the present invention to correctly detect an error occurring during a recording or playback operation.

In order to achieve the above-described objects, according to one aspect of the present invention, there is provided a recording apparatus for recording an audio signal and a video signal on an information recording medium. The recording apparatus includes a video packetized elementary stream packet generator for generating video packetized elementary stream packets by dividing a video elementary stream in which a video signal is compressed and coded according to a predetermined method by a predetermined number of video frames and by adding a header. An audio packetized elementary stream packet generator generates audio packetized elementary stream packets by dividing an audio elementary stream in which an audio signal is compressed and coded according to a predetermined method by a predetermined number of audio frames and by adding a header. A video packetized elementary stream packet unit generator generates a video packetized elementary stream packet unit by combining a predetermined number of the video packetized elementary stream packets. An audio packetized elementary stream packet unit generator generates an audio packetized elementary stream packet unit by combining the audio packetized elementary stream packets corresponding to the video packetized elementary stream packet unit. A sync block generator generates sync blocks by alternately disposing the video packetized elementary stream packet unit and the audio packetized elementary stream packet unit and by converting the video packetized elementary stream packet unit and the audio packetized elementary stream packet unit into a predetermined recording format. A recording unit records the sync blocks on the information recording medium.

The video packetized elementary stream packet generator may generate the video packetized elementary stream packets by dividing the video elementary stream by one video frame, and by adding the header in which at least one of a presentation time stamp and a decoding time stamp is recorded.

The audio packetized elementary stream packet generator may generates the audio packetized elementary stream packets by dividing the audio elementary stream by one audio frame, and by adding the header in which at least a presentation time stamp is recorded.

The audio packetized elementary stream packet unit generator may generate the audio packetized elementary stream packet unit by combining the audio packetized elementary stream packets having a presentation time stamp which is after the earliest value of the presentation time stamps recorded in the headers of the video packetized elementary stream packets forming the current video packetized elementary stream packet unit and which is before the earliest value of the presentation time stamps recorded in the headers of the video packetized elementary stream packets forming the subsequent video packetized elementary stream packet unit.

The aforementioned recording apparatus may further include a separation unit for separating a transport stream in which the compressed and coded video signal and the compressed and coded audio signal are multiplexed into the video elementary stream and the audio elementary stream.

The sync block generator may generate the sync block whose data type is AUX by using transport stream packets of program specific information included in the transport stream.

The sync block generator may generate the sync block by recording ID information indicating the data type of the sync block in the header of the sync block.

The sync block generator may record a flag indicating whether the data area of the sync block is totally occupied with effective data in the header of the sync block, and, when the data area of the sync block is not totally occupied with the effective data, the data length of the effective data may be recorded in the head of the data area.

According to another aspect of the present invention, there is provided a recording method for use in a recording apparatus which records an audio signal and a video signal on an information recording medium. The recording method includes: a video packetized elementary stream packet generating step of generating video packetized elementary stream packets by dividing a video elementary stream in which a video signal is compressed and coded according to a predetermined method by a predetermined number of video frames and by adding a header; an audio packetized elementary stream packet generating step of generating audio packetized elementary stream packets by dividing an audio elementary stream in which an audio signal is compressed and coded according to a predetermined method by a predetermined number of audio frames and by adding a header; a video packetized elementary stream packet unit generating step of generating a video packetized elementary stream packet unit by combining a predetermined number of the video packetized elementary stream packets; an audio packetized elementary stream packet unit generating step of generating an audio packetized elementary stream packet unit by combining the audio packetized elementary stream packets corresponding to the video packetized elementary stream packet unit; a sync block generating step of generating sync blocks by alternately disposing the video packetized elementary stream packet unit and the audio packetized elementary stream packet unit and by converting the video packetized elementary stream packet unit and the audio packetized elementary stream packet unit into a predetermined recording format; and a recording step of recording the sync blocks on the information recording medium.

According to still another aspect of the present invention, there is provided a recording medium for storing a computer-readable program used for recording an audio signal and a video signal on an information recording medium. The computer-readable program includes: a video packetized elementary stream packet generating step of generating video packetized elementary stream packets by dividing a video elementary stream in which a video signal is compressed and coded according to a predetermined method by a predetermined number of video frames and by adding a header; an audio packetized elementary stream packet generating step of generating audio packetized elementary stream packets by dividing an audio elementary stream in which an audio signal is compressed and coded according to a predetermined method by a predetermined number of audio frames and by adding a header; a video packetized elementary stream packet unit generating step of generating a video packetized elementary stream packet unit by combining a predetermined number of the video packetized elementary stream packets; an audio packetized elementary stream packet unit generating step of generating an audio packetized elementary stream packet unit by combining the audio packetized elementary stream packets corresponding to the video packetized elementary stream packet unit; a sync block generating step of generating sync blocks by alternately disposing the video packetized elementary stream packet unit and the audio packetized elementary stream packet unit and by converting the video packetized elementary stream packet unit and the audio packetized elementary stream packet unit into a predetermined recording format; and a recording step of recording the sync blocks on the information recording medium.

According to a further aspect of the present invention, there is provided a recording apparatus for recording an audio signal and a video signal on an information recording medium. The recording apparatus includes a video editing unit generator for generating a video editing unit by dividing a video elementary stream in which a video signal is compressed and coded according to a predetermined method by a predetermined number of video frames. An audio editing unit generator generates an audio editing unit by dividing an audio elementary stream in which an audio signal is compressed and coded according to a predetermined method by a predetermined number of audio frames. A time stamp addition unit adds a time stamp indicating a playback timing to each of the video editing unit and the audio editing unit. A sync block generator generates sync blocks by alternately disposing the video editing unit with the time stamp and the audio editing unit with the time stamp and by converting the video editing unit and the audio editing unit into a predetermined recording format. A recording unit records the sync blocks on the information recording medium.

According to a yet further aspect of the present invention, there is provided a recording method for use in a recording apparatus which records an audio signal and a video signal on an information recording medium. The recording method includes: a video editing unit generating step of generating a video editing unit by dividing a video elementary stream in which a video signal is compressed and coded according to a predetermined method by a predetermined number of video frames; an audio editing unit generating step of generating an audio editing unit by dividing an audio elementary stream in which an audio signal is compressed and coded according to a predetermined method by a predetermined number of audio frames; a time stamp addition step of adding a time stamp indicating a playback timing to each of the video editing unit and the audio editing unit; a sync block generating step of generating sync blocks by alternately disposing the video editing unit with the time stamp and the audio editing unit with the time stamp and by converting the video editing unit and the audio editing unit into a predetermined recording format; and a recording step of recording the sync blocks on the information recording medium.

According to a further aspect of the present invention, there is provided a recording medium for storing a computer-readable program used for recording an audio signal and a video signal on an information recording medium. The computer-readable program includes: a video editing unit generating step of generating a video editing unit by dividing a video elementary stream in which a video signal is compressed and coded according to a predetermined method by a predetermined number of video frames; an audio editing unit generating step of generating an audio editing unit by dividing an audio elementary stream in which an audio signal is compressed and coded according to a predetermined method by a predetermined number of audio frames; a time stamp addition step of adding a time stamp indicating a playback timing to each of the video editing unit and the audio editing unit; a sync block generating step of generating sync blocks by alternately disposing the video editing unit with the time stamp and the audio editing unit with the time stamp and by converting the video editing unit and the audio editing unit into a predetermined recording format; and a recording step of recording the sync blocks on the information recording medium.

According to a further aspect of the present invention, there is provided a playback apparatus for converting an audio signal and a video signal recorded on an information recording medium as packetized elementary stream packets into a transport stream. The playback apparatus includes a reading unit for reading the packetized elementary stream packets from the information recording medium. An initializing unit initializes a system time clock by using one of a decoding time stamp and a presentation time stamp included in a header of each of the packetized elementary stream packets. A first generator generates a program clock reference packet by using a value of the system time clock which is read at predetermined intervals. A conversion unit converts the packetized elementary stream packets into transport stream packets while synchronizing a time obtained by delaying the system time clock by a predetermined period with a time indicating the decoding time stamp or the presentation time stamp included in the header of each of the packetized elementary stream packets.

The initializing unit may initialize the system time clock by using a value obtained by subtracting a predetermined period from the decoding time stamp or the presentation time stamp included in the header of the packetized elementary stream packet to be first read. The first generator may start generating the program clock reference packet earlier by a predetermined period than a time at which the packetized elementary stream packet to be first read is converted into the transport stream packet by the conversion unit.

The aforementioned playback apparatus may further include a second generator for generating a program association table packet and a program map table packet. The second generator may start generating the program association table packet and the program map table packet earlier by a predetermined period than a time at which the first generator starts generating the program clock reference packet.

The conversion unit may convert the packetized elementary stream packets of the video signal into the transport stream packets while synchronizing a time obtained by delaying the system time clock by vbv_delay included in a picture header with the time indicating the decoding time stamp or the presentation time stamp included in the header of each of the packetized elementary stream packets.

The conversion unit may convert the packetized elementary stream packets of the video signal into the transport stream packets at a fixed rate, and may intermittently output the transport stream packets.

The conversion unit may convert the packetized elementary stream packets of the video signal into the transport stream packets at a variable rate, and may output the transports stream packets at regular intervals.

The conversion unit may convert the packetized elementary stream packets of the audio signal into the transport stream packets while synchronizing a time obtained by delaying the system time clock by a predetermined period with a time indicating the presentation time stamp included in the header of each of the packetized elementary stream packets of the audio signal.

According to a further aspect of the present invention, there is provided a playback method for use in a playback apparatus which converts an audio signal and a video signal recorded on an information recording medium as packetized elementary stream packets into a transport stream. The playback method includes: a reading step of reading the packetized elementary stream packets from the information recording medium; an initializing step of initializing a system time clock by using one of a decoding time stamp and a presentation time stamp included in a header of each of the packetized elementary stream packets; a first generation step of generating a program clock reference packet by using a value of the system time clock which is read at predetermined intervals; and a conversion step of converting the packetized elementary stream packets into transport stream packets while synchronizing a time obtained by delaying the system time clock by a predetermined period with a time indicating the decoding time stamp or the presentation time stamp included in the header of each of the packetized elementary stream packets.

According to a further aspect of the present invention, there is provided a recording medium for storing a computer-readable program used for converting an audio signal and a video signal recorded on an information recording medium as packetized elementary stream packets into a transport stream. The computer-readable program includes: a reading step of reading the packetized elementary stream packets from the information recording medium; an initializing step of initializing a system time clock by using one of a decoding time stamp and a presentation time stamp included in a header of each of the packetized elementary stream packets; a first generation step of generating a program clock reference packet by using a value of the system time clock which is read at predetermined intervals; and a conversion step of converting the packetized elementary stream packets into transport stream packets while synchronizing a time obtained by delaying the system time clock by a predetermined period with a time indicating the decoding time stamp or the presentation time stamp included in the header of each of the packetized elementary stream packets.

According to a further aspect of the present invention, there is provided a recording apparatus for recording a plurality of data streams on an information recording medium. The recording apparatus includes a dividing unit for generating sync blocks by dividing each of the data streams, which consists of packets, according to a predetermined data length. A providing unit provides ID information indicating the type of each of the data streams and a count value for identifying the order of the identical type of data streams to each of the sync blocks. A recording unit mixes the sync blocks generated from the different types of data streams and records the sync blocks on the information recording medium.

The providing unit may provide a discontinuous count value to the sync block in case of the occurrence of an error in the corresponding data stream.

The dividing unit may generate the sync blocks by dividing a transport stream packet into a first part and a second part. The providing unit may provide the count value to one of the sync block generated from the first part of the transport stream packet and the sync block generated from the second part of the stream packet.

According to a further aspect of the present invention, there is provided a recording method for use in a recording apparatus which records a plurality data streams on an information recording medium. The recording method includes: a dividing step of generating sync blocks by dividing each of the data streams, which consists of packets, according to a predetermined data length; a providing step of providing identification information indicating the type of each of the data streams and a count value for identifying the order of the identical type of data streams to each of the sync blocks; and a recording step of mixing the sync blocks generated from the different types of data streams and recording the sync blocks on the information recording medium.

According to a further aspect of the present invention, there is provided a recording medium for storing a computer-readable program used for recording a plurality of data streams on an information recording medium. The computer-readable program includes: a dividing step of generating sync blocks by dividing each of the data streams, which consists of packets, according to a predetermined data length; a providing step of providing identification information indicating the type of each of the data streams and a count value for identifying the order of the identical type of data streams to each of the sync blocks; and a recording step of mixing the sync blocks generated from the different types of data streams and recording the sync blocks on the information recording medium.

According to a further aspect of the present invention, there is provided a playback apparatus for playing back data streams recorded on an information recording medium. The playback apparatus includes a reading unit for reading sync blocks from the information recording medium. An extraction unit extracts ID information indicating the type of each of the data streams and a count value for identifying the order of the identical type of data streams from the sync blocks read by the reading unit. A playback unit plays back the data streams by using the sync blocks read by the reading unit based on the ID information and the count value extracted by the extraction unit. An insertion unit detects the occurrence of an error based on the count value extracted by the extraction unit and inserts error information into the data stream played back by the playback unit.

According to a further aspect of the present invention, there is provided a playback method for use in a playback apparatus which playing back data streams recorded on an information recording medium. The playback method includes: a reading step of reading sync blocks from the information recording medium; an extraction step of extracting ID information indicating the type of each of the data streams and a count value for identifying the order of the identical type of data streams from the sync blocks read in the reading step; a playback step of playing back the data streams by using the sync blocks read in the reading step based on the ID information and the count value extracted in the extraction step; and an insertion step of detecting the occurrence of an error based on the count value extracted in the extraction step and inserting error information into the data stream played back in the playback step.

According to a further aspect of the present invention, there is provided a recording medium for storing a computer-readable program used for playing back data streams recorded on an information recording medium. The computer-readable program includes: a reading step of reading sync blocks from the information recording medium; an extraction step of extracting ID information indicating the type of each of the data streams and a count value for identifying the order of the identical type of data streams from the sync blocks read in the reading step; a playback step of playing back the data streams by using the sync blocks read in the reading step based on the ID information and the count value extracted in the extraction step; and an insertion step of detecting the occurrence of an error based on the count value extracted in the extraction step and inserting error information into the data stream played back in the playback step.

BRIEF DESCRIPTION OF THE DRAWINGS

FIG. 2 illustrates the ES recording method;

FIG. 3 illustrates the PES recording method;

FIG. 7 illustrates the SB header;

FIG. 24 illustrates error handling performed during TS recording.

DESCRIPTION OF THE PREFERRED EMBODIMENTS

An AV recording/playback apparatus is described in detail below through illustration of an embodiment of the present invention. The AV recording/playback apparatus converts input video and audio baseband signals into packetized elementary streams (hereinafter referred to as a "PESs") and records them on a magnetic tape. The AV recording/playback apparatus also converts input TSs into PESs and records them on the magnetic tape, or directly records input TSs on the magnetic tape without converting them into PESs. The AV recording/playback apparatus reads PESs recorded on the magnetic tape, and converts PESs recorded on the magnetic tape into TSs and outputs them.

Figure 1:
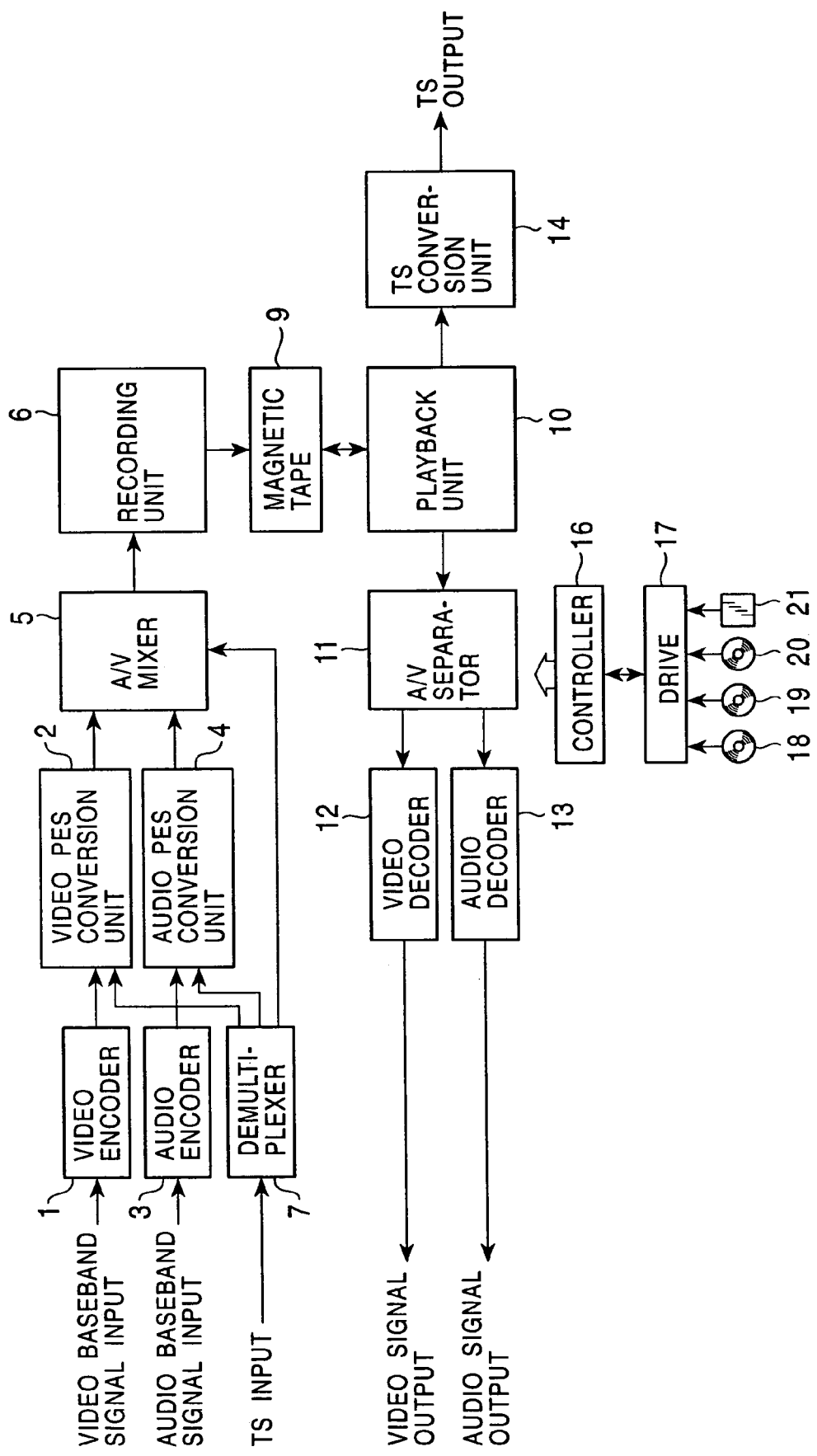
FIG. 1 is a block diagram illustrating the configuration of an AV recording/playback apparatus according to the present invention.

FIG. 1 illustrates an example of the configuration of an AV recording/playback apparatus. A video encoder 1 encodes an input video baseband signal according to the MPEG method so as to generate a video elementary stream (hereinafter referred to as an "ES"), and outputs the video ES to a video PES conversion unit 2. The video PES conversion unit 2 converts the video ES into a video PES and outputs it to an A/V mixer 5. Alternatively, the video PES conversion unit 2 may directly output the video ES received from the video encoder 1 to the A/V mixer 5. The video PES conversion unit 2 also converts video TS packets input from a demultiplexer 7 into video PES packets, and outputs them to the A/V mixer 5.

An audio encoder 3 encodes an input audio baseband signal according to the MPEG method so as to generate an audio ES, and outputs it to an audio PES conversion unit 4. The audio PES conversion unit 4 converts the audio ES received from the audio encoder 3 into an audio PES and outputs it to the A/V mixer 5. Alternatively, the audio PES conversion unit 4 may directly output the audio ES to the A/V mixer 5. The audio PES conversion unit 4 also converts audio TS packets input from the demultiplexer 7 into audio PES packets and outputs them to the A/V mixer 5.

The A/V mixer 5 converts the video PES packets received from the video PES conversion unit 2 and the audio PES packets received from the audio PES conversion unit 4 into a predetermined recording format (discussed later), and outputs the resulting sync blocks to a recording unit 6. The A/V mixer 5 also adds a time stamp to the TS packets input from the demultiplexer 7, and converts them to a predetermined recording format. The resulting sync blocks are then output to the recording unit 6. The A/V mixer 5 adds a time stamp to a video ES editing unit (described below) which has passed through the video PES conversion unit 2 without being converted into a PES and an audio ES editing unit (described below) which has passed through the audio PES conversion unit 4 without being converted into a PES, and converts them to a predetermined recording format. The resulting sync blocks are then output to the recording unit 6.

The recording unit 6 then randomizes the sync blocks received from the A/V mixer 5 according to the M sequence, as in the DV format used in conventional consumer digital VCRs. Subsequently, the recording unit 6 restricts the run length and superimposes the tracking frequencies according to 24-to-25 conversion, and records the randomized sync blocks on a magnetic tape 9.

The demultiplexer 7 outputs video TS packets contained in a received TS to the video PES conversion unit 2, audio TS packets to the audio PES conversion unit 4, and also, outputs TS packets of program system information (PSI) to the A/V mixer 5. The demultiplexer 7 also breaks up an input non-native TS (discussed later) into the individual TS packets, and outputs them to the A/V mixer 5. The demultiplexer 7 may discard the PCR packets.

A playback unit 10 reads the sync blocks recorded on the magnetic tape 9 so as to play back the PESs, and outputs them to an A/V separator 11 or a TS conversion unit 14. The playback unit 10 also reads the sync blocks recorded on the magnetic tape 9 so as to play back the TSs, and outputs them to the A/V separator 11 or the TS conversion unit 14.

The A/V separator 11 separates the PESs or the TSs received from the playback unit 10 into a video data stream and an audio data stream, and outputs them to a video decoder 12 and an audio decoder 13, respectively.

The video decoder 12 decodes the video data stream received from the A/V separator 11 and outputs the resulting video signal. The audio decoder 13 decodes the audio data stream received from the A/V separator 11 and outputs the resulting audio signal.

The TS conversion unit 14 converts the PESs received from the playback unit 10 into TSs and outputs them. The TS conversion unit 14 also adds a sync byte (discussed below) to the head of TS packets from which a sync byte is eliminated.

A controller 16 controls a drive 17 to cause it to read a control program stored in a magnetic disk 18, an optical disc 19, a magneto-optical disk 20, or a semiconductor memory 21, and controls the individual elements of the AV recording/playback apparatus based on the read control program.

A recording method employed in the AV recording/playback apparatus constructed as described above is discussed below. FIG. 2 illustrates an example of the arrangement of ESs on the magnetic tape 9. As shown in FIG. 2, for video signals, every group of three frames, such as an I picture, a B picture, and a B picture, or a P picture, a B picture, and a B picture, forms a video editing unit. For audio signals, the corresponding audio editing unit is disposed between the video editing units.

In FIG. 2, an audio editing unit formed of four frames (equivalent to audio access units (AAU)) or an audio editing unit formed of five frames is disposed between the three-frame video editing units.

In actuality, however, the number of audio frames for the three-frame video editing units is not an integer. Thus, a special time stamp (T.S.), which represents the playback time, is added to each video or audio editing unit. By virtue of the time stamps, a video signal and an audio signal can be read in synchronization with each other.

The method for recording the ESs on the magnetic tape 9, as shown in FIG. 2, is referred to as the "ES recording method". According to the ES recording method, a video editing unit provided with a special time stamp and the corresponding audio editing unit provided with a special time stamp are disposed adjacent to each other. It is thus possible to avoid temporal displacement in the continuity between a video frame and an audio frame when they are spliced.

FIG. 3 illustrates an example of the arrangement of PESs on the magnetic tape 9. More specifically, instead of adding the special time stamps shown in FIG. 2, according to the syntax of PES packets, a presentation time stamp (PTS) indicating playback output time management information and a decoding time stamp (DTS) indicating decoding time management information are added to a three-frame video editing unit and the corresponding audio editing unit so as to form a PES packet.

The method for recording the video frames and audio frames on the magnetic tape 9 as shown in FIG. 3 is referred to as the "PES recording method". The PES recording method is advantageous over the ES recording method in the following respect. In reading the PESs from the magnetic tape 9 and outputting them as TSs, the PESs are easily converted into TSs because of the addition of PTSs and DTSs.

The structure of the PES packets is not unique. Concerning video packets, for example, one PES packet may be formed of one video frame or a GOP having a plurality of video frames. Regarding audio packets, for example, one PES packet may be formed of one audio frame (AAU) or a plurality of audio frames.

To facilitate the editing operation., the PES structure used in the PES recording method is standardized for both video packets and audio packets so that one frame forms one PES packet.

Before describing the recording format suitable for recording PESs on the magnetic tape 9, the data structure of a TS packet and that of a PES packet are discussed below. The recording format, which is discussed below, is applicable when ESs are recorded on the magnetic tape 9. The recording format is also applicable to TSs to, for example, multi-program TSs.

Figure 4:
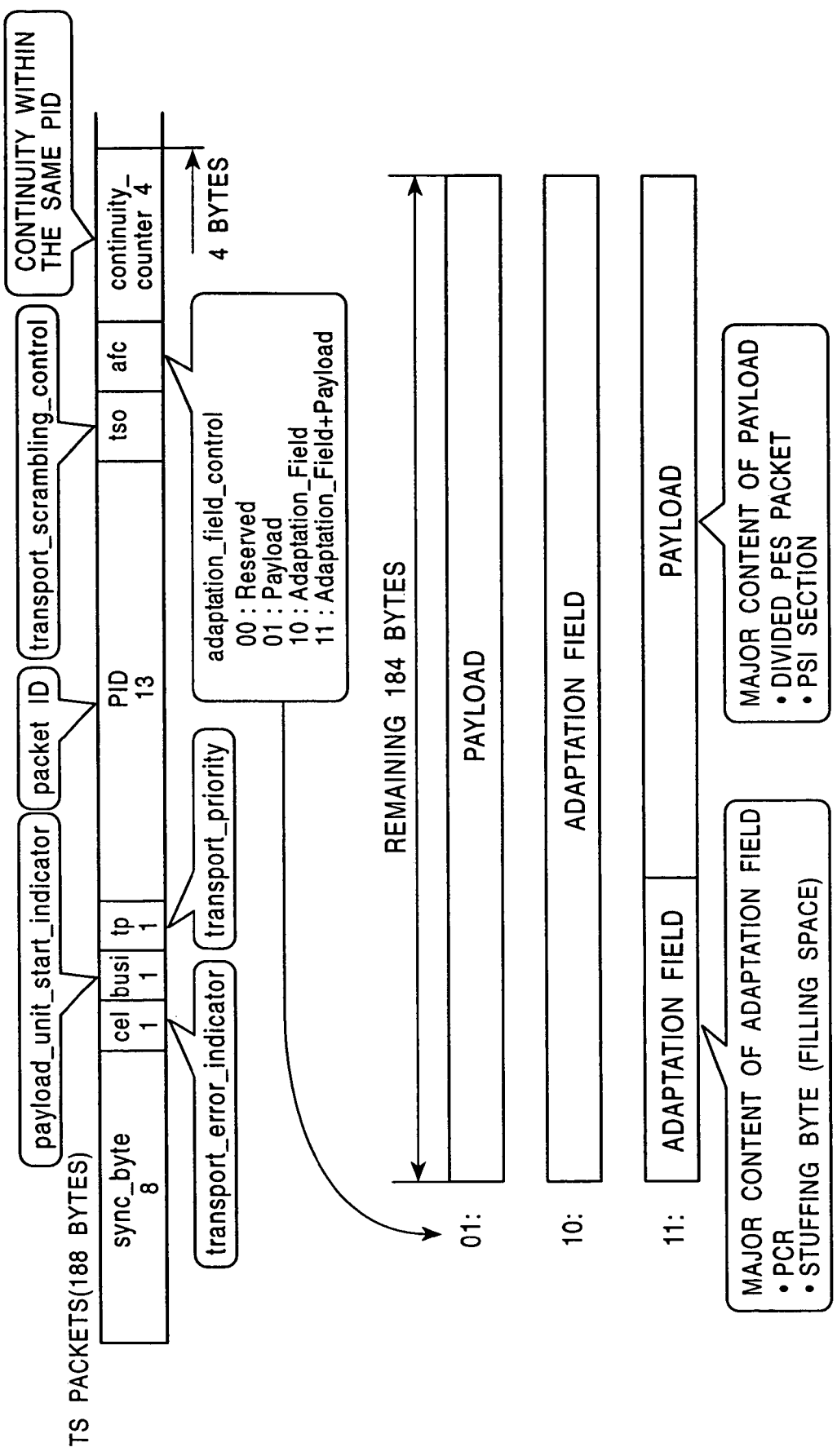
FIG. 4 illustrates the data structure of a TS packet.

FIG. 4 illustrates the data structure of a TS packet. The TS packet is a fixed-length (188 bytes) packet formed of an eight-bit sync byte (sync_byte), a one-bit transport error indicator (transport_error_indicator), a one-bit payload unit start indicator (payload_unit_start_indicator), a one-bit transport priority (transport_priority), 13-bit packet ID information (packet_ID), two-bit scrambling control (transport_scrambling_control), two-bit adaptation field control (adaptation_field_control), a four-bit continuity counter (continuity_counter), and a 184-byte adaptation field.

The sync byte indicates the head of the TS packet. The transport error indicator indicates the presence or the absence of a bit error in the TS packet. The payload unit start indicator indicates that the head of a PES packet is recorded in the payload of the TS packet. The packet priority designates the priority level of the TS packet. The packet ID information represents the attributes of the individual streams of the TS packet. The scrambling control indicates the presence or the absence and the type of scrambling of the payload of the TS packet. The adaptation field control indicates the presence or the absence of the adaptation field and that of the payload. The continuity counter designates the order of a plurality of TS packets having the same packet ID Information.

In the adaptation field, not only the PCR, but also additional information of the individual streams, are recorded. If the additional information to be recorded in the adaptation field is less than 184 bytes, stuffing bytes are filled in the adaptation field. In the payload, the divided PES packets, PSI, etc., are recorded.

Figure 5:
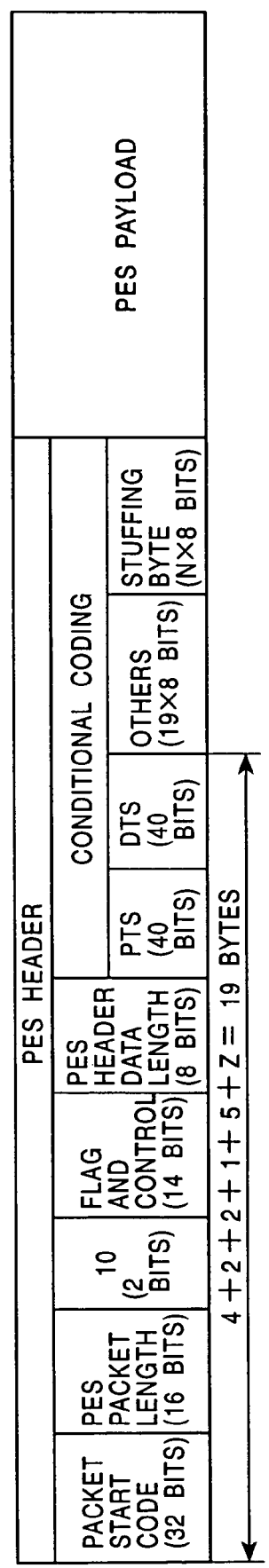
FIG. 5 illustrates the data structure of a PES packet.

FIG. 5 illustrates the data structure of the PES packet. The PES packet is a variable-length packet formed of a 32-bit packet start code, a 16-bit PES packet length, two-bit "10", 14-bit flag and control, an eight-bit PES header data length, a 40-bit PTS, a 40-bit DTS, 152 bits of other information, a PES header having 8N-bit stuffing bytes, and a variable-length payload.

The packet start code represents the head of the PES packet and contains a 24-bit header start code and an eight-bit stream ID. In the PES packet length, the data length of the PES packet is recorded. "10" after the PES packet length indicates that the packet is a PES packet. In the flag and control, the presence or the absence and the type of scrambling of the PES packet, the priority, copyright information, etc., are recorded. In the PES header data length, the data length of the PES header is recorded.

Figure 6:
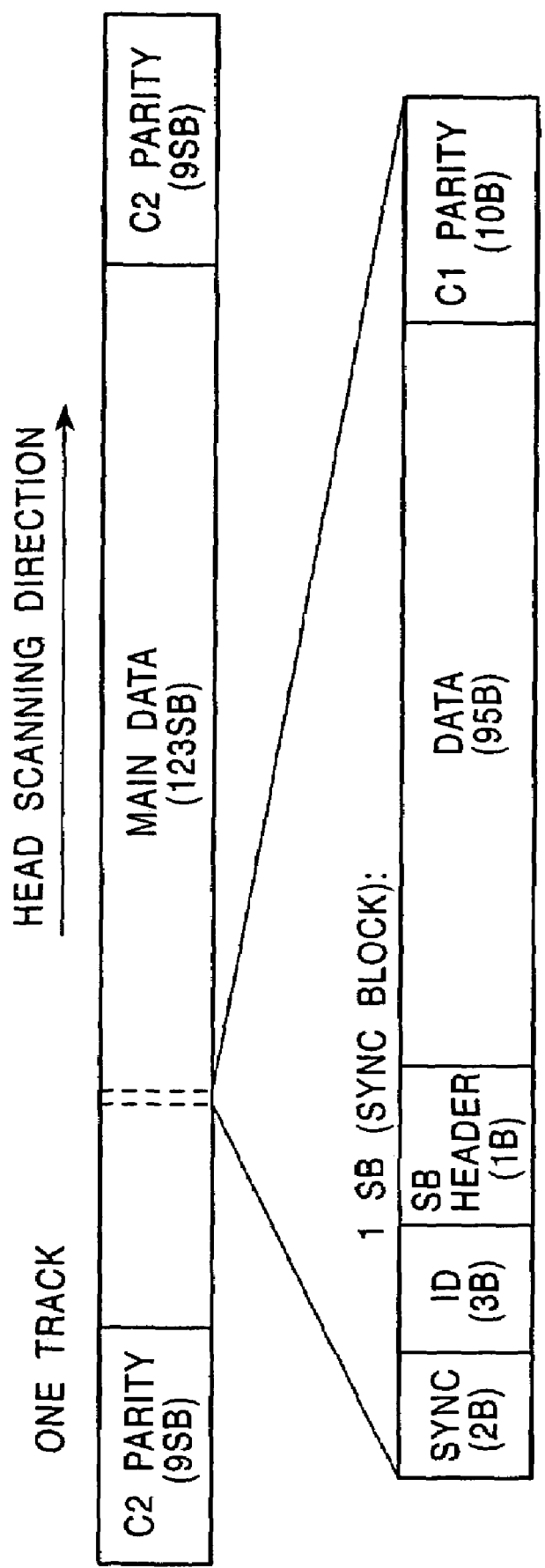
FIG. 6 illustrates SBs in one track.

The recording format of the magnetic tape 9 is discussed below with reference to FIG. 6. On one track of the magnetic tape 9, 141 sync blocks (hereinafter referred to as "SBs"), are recorded. An error correcting C2 parity is recorded by using 9 SBs at each side of the track. In the remaining 123 SBs sandwiched between the C2 parities, main data (for example, PES packets) is recorded.

An SB, having a fixed length of 111 bytes, is formed of a two-byte sync, a three-byte ID, a one-byte SB header, a 95-byte data area, and a 10-byte error correcting C1 parity.

In the three-byte ID, a track number, an SB number, and an overwrite protect code are recorded. The overwrite protect code is updated every time information is overwritten on the same SB and prevents previous data from remaining recorded.

FIG. 7 illustrates information to be recorded in the one-byte (eight-bit) SB header. The three most significant bits (MSBs) (bit-7 through bit-5 in FIG. 7) of the SB header represent the type of data recorded on the 95-byte data area subsequent to the SB header. The information recorded in the five least significant bits (LSBs) (bit-4 through bit-0 in FIG. 7) is varied according to the data type.

When the three MSBs of the SB header indicate 000, the data type is PES-VIDEO. When the three MSBs indicate 001, the data type is PES-AUDIO. When the data type is PES-VIDEO or PES-AUDIO, a full/partial flag is recorded in the fourth MSB bit (bit-4 in FIG. 7). In the subsequent four LSB bits (bit 3 through bit 0 in FIG. 7), the continuity count value representing the continuity of the SBs of the same data type is recorded.

Figure 8:
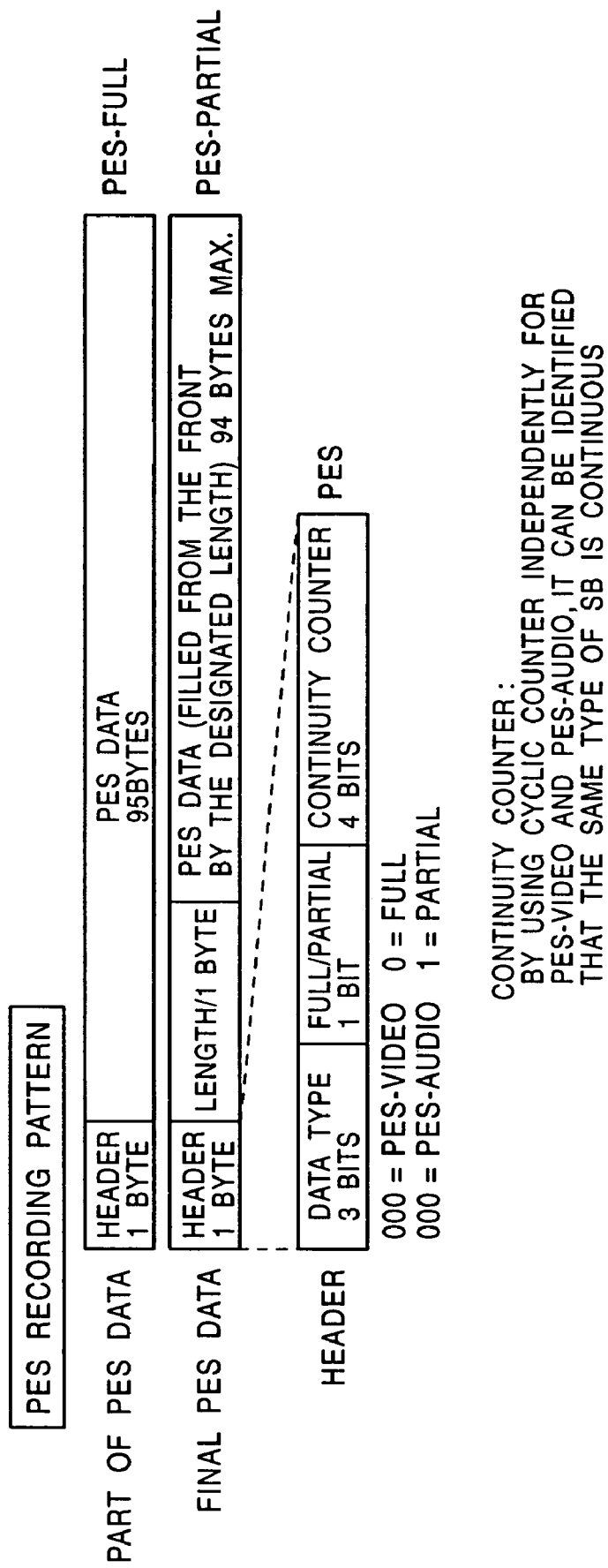
FIG. 8 illustrates the data structure of SBs whose data type is PES-VIDEO or PES-AUDIO.

FIG. 8 illustrates the SB data structure whose data type is PES-VIDEO or PES-AUDIO. If the whole 95-byte data area after the SB header is occupied with PES packets, the full/partial flag of the SB header indicates 0. If the data area is not totally occupied with PES packets, the full/partial flag indicates 1, and the data length of the PES packets is recorded in one byte of the MSB of the data area.

Referring back to FIG. 7, when the three MSBs designate 010, the data type is SEARCH-DATA. In this case, a video/audio flag is recorded in the fourth MSB of the SB header, and the search speed is recorded in the subsequent three bits. The remaining one bit is reserved. In the data area, fixed-size search data is recorded. The positions of the SBs on the track whose data type is SEARCH-DATA are predetermined, and the SBs whose data type is other than SEARCH-DATA are located to avoid the SBs whose data type is SEARCH-DATA.

When the three MSBs of the SB header indicate 011, the data type is AUX. In this case, the AUX mode is recorded in the fourth through sixth MSBs of the SB header. The remaining two bits are reserved. In the data area, fixed-size AUX data (auxiliary information) is recorded.

The three-bit AUX mode indicates the type of AUX data. When the three bits indicate 000, the AUX mode is AUX_V, and AUX data accompanied with the video data is recorded in the data area. When the three bits designate 001, the AUX mode is AUX_A, and AUX data accompanied with the audio data is recorded in the data area. When the three bits indicate 010, the AUX mode is PSI-1, and the first half of the TS packet of the PSI is recorded in the data area. When the three bits indicate 011, the AUX mode is PSI-2, and the second half of the TS packet of the PSI is recorded in the data area. When the three bits indicate 100, the AUX mode is SYSTEM, and system AUX data is recorded in the data area.

Figure 9:
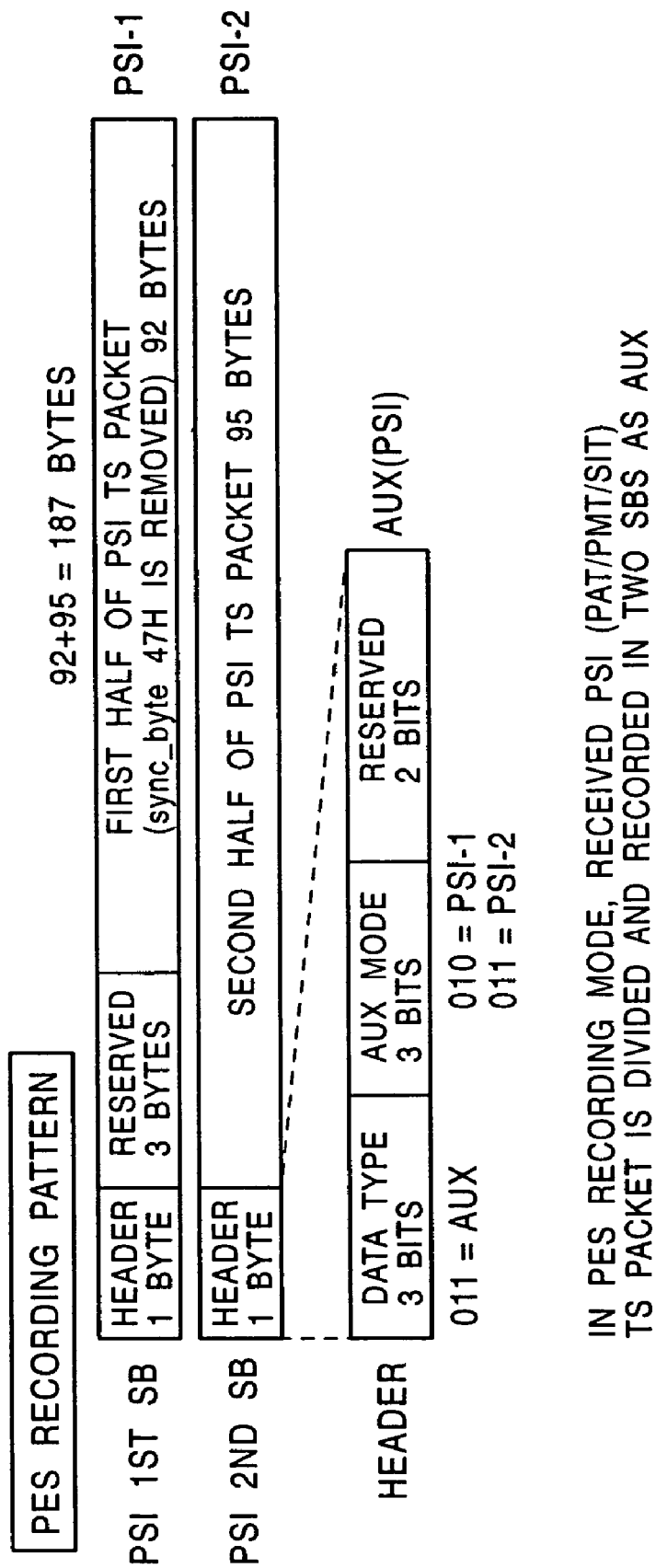
FIG. 9 illustrates the data structure of SBs whose data type is AUX.

FIG. 9 illustrates the data structure of an SB whose data type is AUX and whose AUX mode is PSI-1 or PSI-2. The first three bytes of the data area of an SB whose AUX mode is PSI-1 are reserved. In the subsequent 92 bytes, 92 bytes of the first half of the TS packet (188 bytes) of the PSI, except for the one-byte sync byte (sync_byte), are recorded. In the data area of an SB whose AUX mode is PSI-2, 95 bytes of the second half of the TS packet of the PSI corresponding to the first half recorded in the data area of the SB whose AUX mode is PSI-1 are recorded. That is, one TS packet of the PSI is divided and recorded in two types of SBs whose AUX modes are PSI-1 and PSI-2.

Referring back to FIG. 7, When the three MSBs of the SB header designate 100, the data type is TS-1. In this case, the fourth and fifth MSBs of the SB header are reserved. In the remaining three bits and the first three bytes (24 bits) of the subsequent data area, a 27-bit time stamp is recorded.

When the three MSBs of the SB header indicate 101, the data type is TS-2. In this case, in the five LSBs, the continuity count value is recorded.

Figure 10:
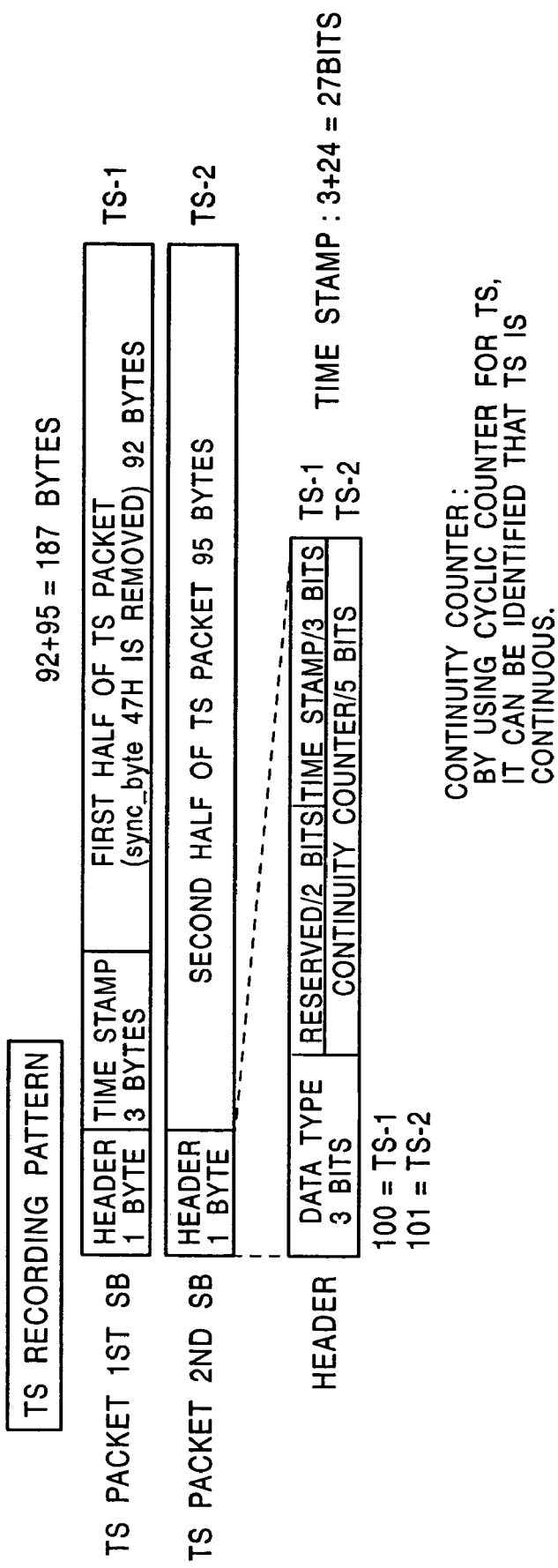
FIG. 10 illustrates the data structure of SBs whose data is TS-1 or TS-2.

FIG. 10 illustrates the data structure of an SB whose data type is TS-1 or TS-2. As discussed above, the first three bytes of the data area of an SB whose data type is TS-1 are used for recording a 27-bit time stamp in combination with the three LSBs of the SB header. In the subsequent 92 bytes of the data area, 92 bytes of the first half of the TS packet (188 bytes), except for the sync byte (sync_byte) of the head, are recorded. In the data area whose data type is TS-2, 95 bytes of the second half of the TS packet corresponding to the first half recorded on the data area of the SB whose data type is TS-1 are recorded.

That is, one TS packet is divided and recorded in two types of SBs whose data type are TS-1 and TS-2. The continuity count value recorded in the SB header whose data type is TS-2 indicates the continuity of the TS packet recorded in the TS-1 SB and TS-2 SB.

Referring back to FIG. 7, when the three MSBs of the SB header indicate 110, the data type is NULL. In this case, in the data area, invalid data which is only used for achieving the recording rate is recorded. The data bytes recorded after the SB header whose data type is NULL are ignored.

When the three MSBs of the SB header indicate 111, the data type is undefined (reserved).

A description is given below, with reference to FIGS. 11 through 14, of the four types of recording processing performed by the AV recording/playback apparatus of the present invention. FIGS. 11 through 14 illustrate the concepts of the recording processing. In the following description, ESs, PESs, and TSs consisting of PESs, formed by the video encoder 1, the video PES conversion unit 2, the audio encoder 3, and the audio PES conversion unit 4 are referred to as "native ESs", "native PESs", and "native TSs", respectively, and the other ESs, PESs, and TSs are referred to as "non-native ESs", "non-native PESs", and "non-native TSs", respectively.

Figure 11:
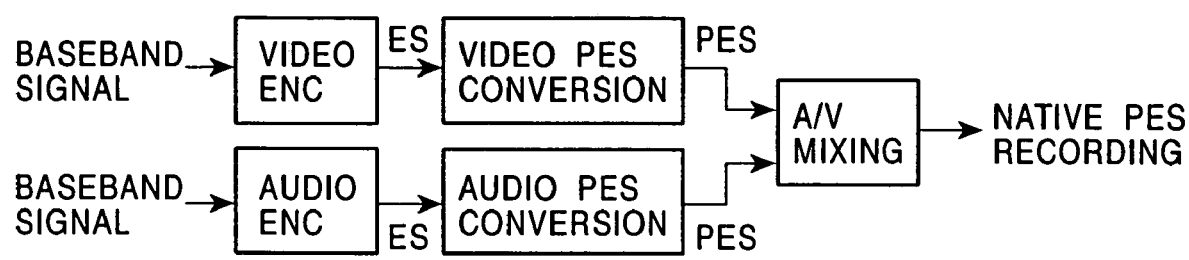
FIG. 11 illustrates the concept of first recording processing.
Figure 12:
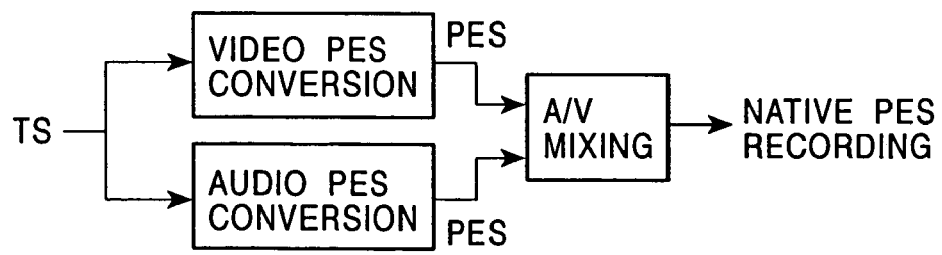
FIG. 12 illustrates the concept of second recording processing.

According to the first recording processing, as shown in FIG. 11, a native ES is formed into a PES, and the PES is recorded as a native PES. According to the second recording processing, as shown in FIG. 12, a native TS is formed into a PES, and the PES is recorded as a native PES.

Figure 13:
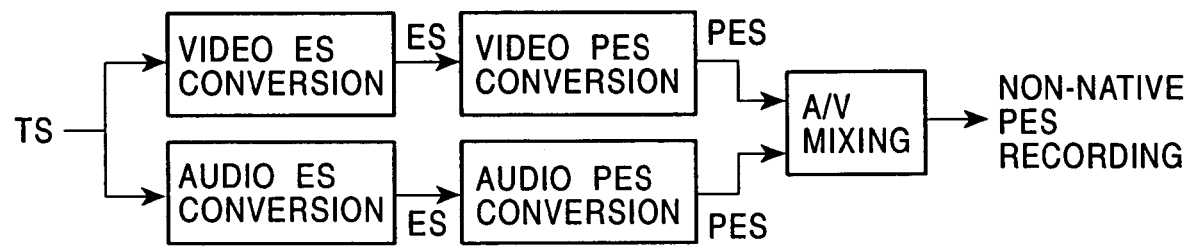
FIG. 13 illustrates the concept of third recording processing.

According to the third recording processing, as illustrated in FIG. 13, a non-native TS is formed into ESs, the ESs are then formed into PESs, and the PESs are recorded as a non-native PES. The third recording processing is applicable only when the TS is not a multi-program but a single program, and vbv_delay is added to the video ES. The reason is as follows. If vbv_delay is not added (that is, if 0xFFFF is recorded in vbv_delay), the arrival time information is lost when a TS is formed into a PES, and a TS cannot be read during a playback operation.

Figure 14:
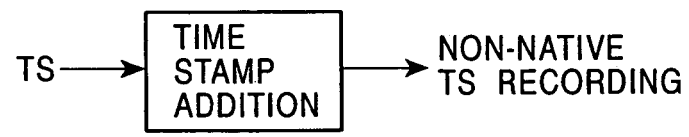
FIG. 14 illustrates the concept of fourth recording processing.

According to the fourth recording processing, as illustrated in FIG. 14, a time stamp is added to a non-native TS, and the TS is recorded as a non-native TS. The fourth recording processing is applicable to TSs which do not satisfy the above-described condition under which the third recording processing can be applied.

The first through fourth recording types of processing are more specifically discussed below.

Figure 15:
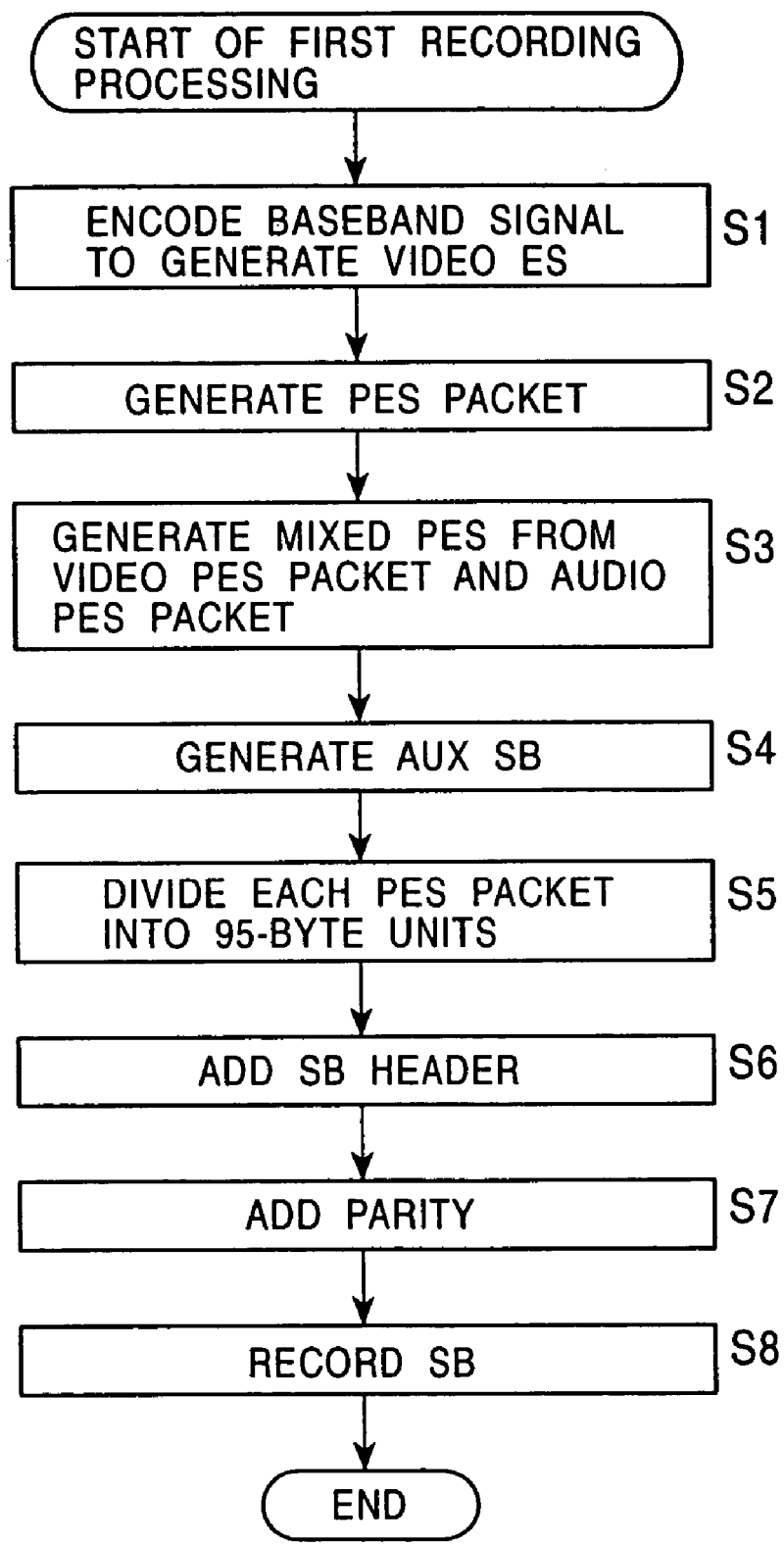
FIG. 15 is a flow chart illustrating the first recording processing.

A description is first given of the first recording processing with reference to the flow chart of FIG. 15. In step S1, the video encoder 1 encodes an input video baseband signal according to the MPEG method so as to generate a video ES, and outputs it to the video PES conversion unit 2. In this case, the video baseband signal is accurately encoded at a bit rate equivalent to the maximum bit rate to be recorded in the sequence header. A precise value is recorded in vbv_delay of the picture header.

The audio encoder 3 encodes an input audio baseband signal according to the MPEG method so as to generate an audio ES, and outputs it as the audio PES conversion unit 4.

In step S2, the video PES conversion unit 2 adds a PES header including the PTS and the DTS to each video frame of the video ES received from the video encoder 1 so as to generate PES packets, and outputs them to the A/V mixer 5.

Meanwhile, the audio PES conversion unit 4 adds a PES header including the PTS and the DTS to each audio frame (AAU) of the audio ES received from the audio encoder 3 so as to generate PES packets, and outputs them to the A/V mixer 5.

In step S3, the A/V mixer 5 selects three PES packets, i.e., an I picture, a B picture, and a B picture, or a P picture, a B picture, and a B picture, from the video PES packets output from the video PES conversion unit 2, and combines the three PES packets into an editing unit. The A/V mixer 5 also sets the earliest value of the PTS time of the three frame images to PTS1, and the earliest value of the PTS time of the subsequent three frame images to PTS2. Then, the A/V mixer 5 combines audio PES packets having a PTS after PTS1 and before PTS2 into an editing unit, and alternately and sequentially places the audio editing unit and the video editing unit, thereby generating a mixed PES.

In step S4, the A/V mixer 5 generates an SB whose data type is AUX and whose AUX mode is AUX_V or AUX_A, and records auxiliary information, such as copyright information, in the data area of the SB, and then inserts the AUX SB at the boundaries of the mixed PESs.

In step S5, the A/V mixer 5 divides each of the alternately disposed video PES packets and the audio PES packets into 95-byte units so that they can be placed in the data areas of SBs whose data type is PES_VIDEO or PES_AUDIO. As has been discussed with reference to FIG. 8, when the divided PES packet has 95 bytes and occupies the whole data area of the SB, the A/V mixer 5 records 0 in the full/partial flag of the SB header. In contrast, when the divided PES packet has less than 95 bytes and does not fill the whole data area (95 bytes) of the SB, the A/V mixer 5 records the data length in the first byte of the header of the divided PES packet and also records 1 in the full/partial flag of the SB header.

In step S6, the A/V mixer 5 records the continuity count value in the SB header of each SB whose data type is PES_VIDEO or PES_AUDIO. Then, the A/V mixer 5 adds the SB header to each 95-byte PES packet obtained in step S5. The generated SBs are stored in a memory device which is formed in the interleave units and is built in the A/V mixer 5.

The A/V mixer 5 also generates SBs whose data type is SEARCH_DATA in which search data is recorded, and SBs whose data type is AUX in which system auxiliary information is recorded and whose AUX mode is SYSTEM. The generated SBs are stored at predetermined positions of the memory device integrated in the A/V mixer 5.

If the generated SBs do not meet the recording rate of the magnetic tape 9, the A/V mixer 5 generates SBs whose data type is NULL. The generated SBs are stored in the memory device built in the A/V mixer 5.

In step S7, after generating a C2 parity for one track of SBs, the A/V mixer 5 adds a C1 parity to the end of each SB and starts outputting the SBs to the recording unit 6 in accordance with the order of the SBs to be recorded on the magnetic tape 9.

In step S8, the recording unit 6 randomizes the SBs sequentially received from the A/V mixer 5 according to the M sequence, as in the DV format used in conventional consumer digital VCRs. Thereafter, the recording unit 6 restricts the run length and superimposes the tracking frequencies according to 24-to-25 conversion, and then records the randomized SBs on the magnetic tape 9.

Figure 16:
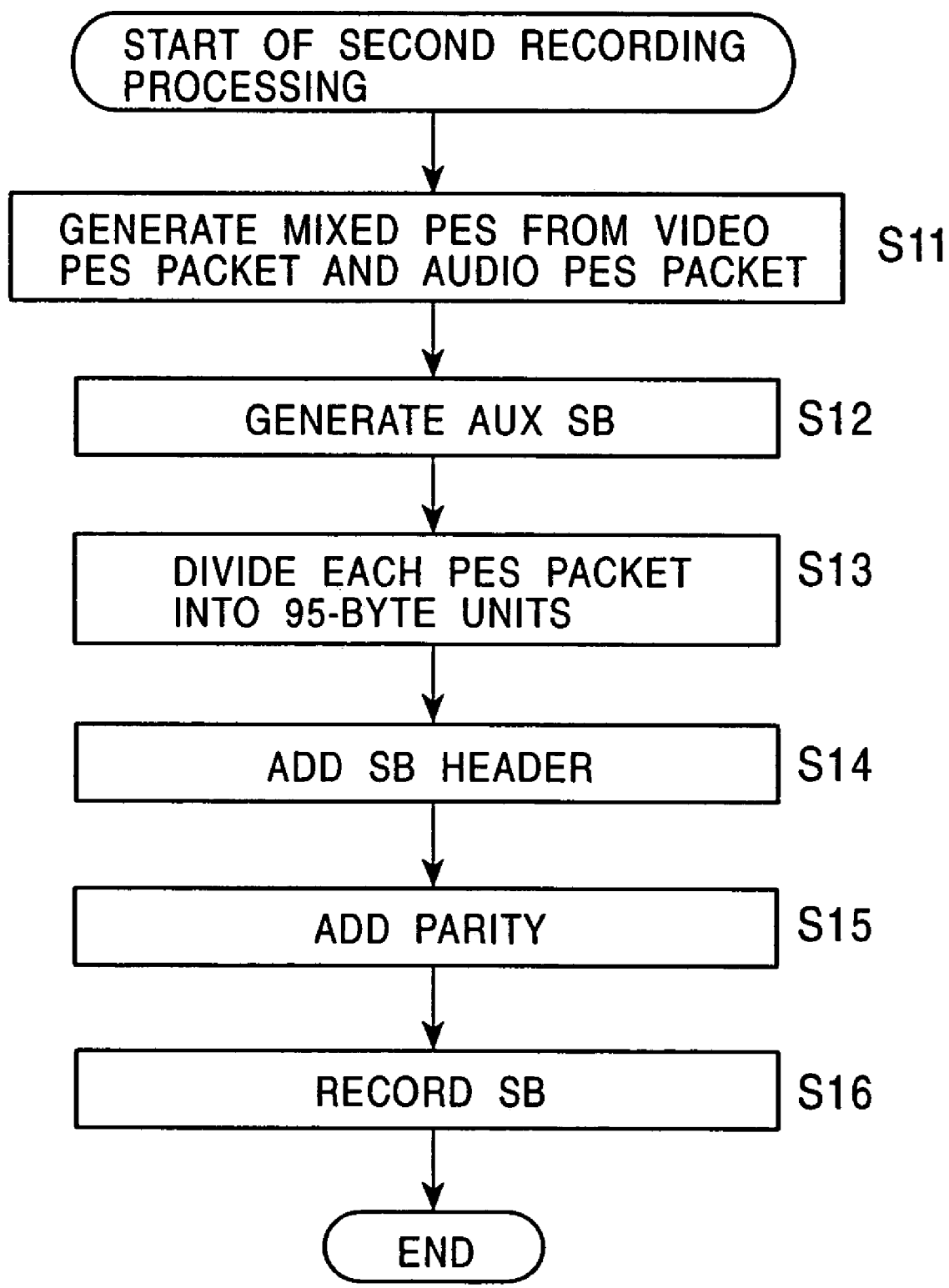
FIG. 16 is a flow chart illustrating the second recording processing.

The second recording processing is now discussed with reference to the flow chart of FIG. 16. The second recording processing starts when it is determined based on information recorded in the descriptor of a program map table (PMT), which is input together with the TS into the demultiplexer 7, that the TS is native.

In step S11, the demultiplexer 7 separates an input TS into a video TS packet and an audio TS packet, and outputs them to the video PES conversion unit 2 and the audio PES conversion unit 4, respectively. In this case, the demultiplexer 7 detects the occurrence of an error in TS packets or the discontinuity of TS packets based on the transport error indicator or the continuity counter, respectively, disposed at the header of the TS packet, and discards such TS packets. The demultiplexer 7 also reports the occurrence or an error or the discontinuity of TS packets to the A/V mixer 5 via the controller 16. Moreover, the demultiplexer 7 discards the PCR contained in the TS.

The video PES conversion unit 2 reconstructs the video PES packets from the video TS packets received from the demultiplexer 7, and outputs them to the A/V mixer 5. The video PES conversion unit 2 also extracts auxiliary information, such as copyright information, from the video TS packets and outputs it to the A/V mixer 5. Since the reconstructed video PES packets are native, each PES packet is formed of one video frame.

Meanwhile, the audio PES conversion unit 4 reconstructs audio PES packets from the audio TS packets input from the demultiplexer 7, and outputs them to the A/V mixer 5. The audio PES conversion unit 4 also extracts auxiliary information, such as copyright information, from the audio TS packets, and outputs it to the A/V mixer 5. Since the reconstructed audio PES packets are native, each PES packet is formed of one frame (AAU).

Figure 17:
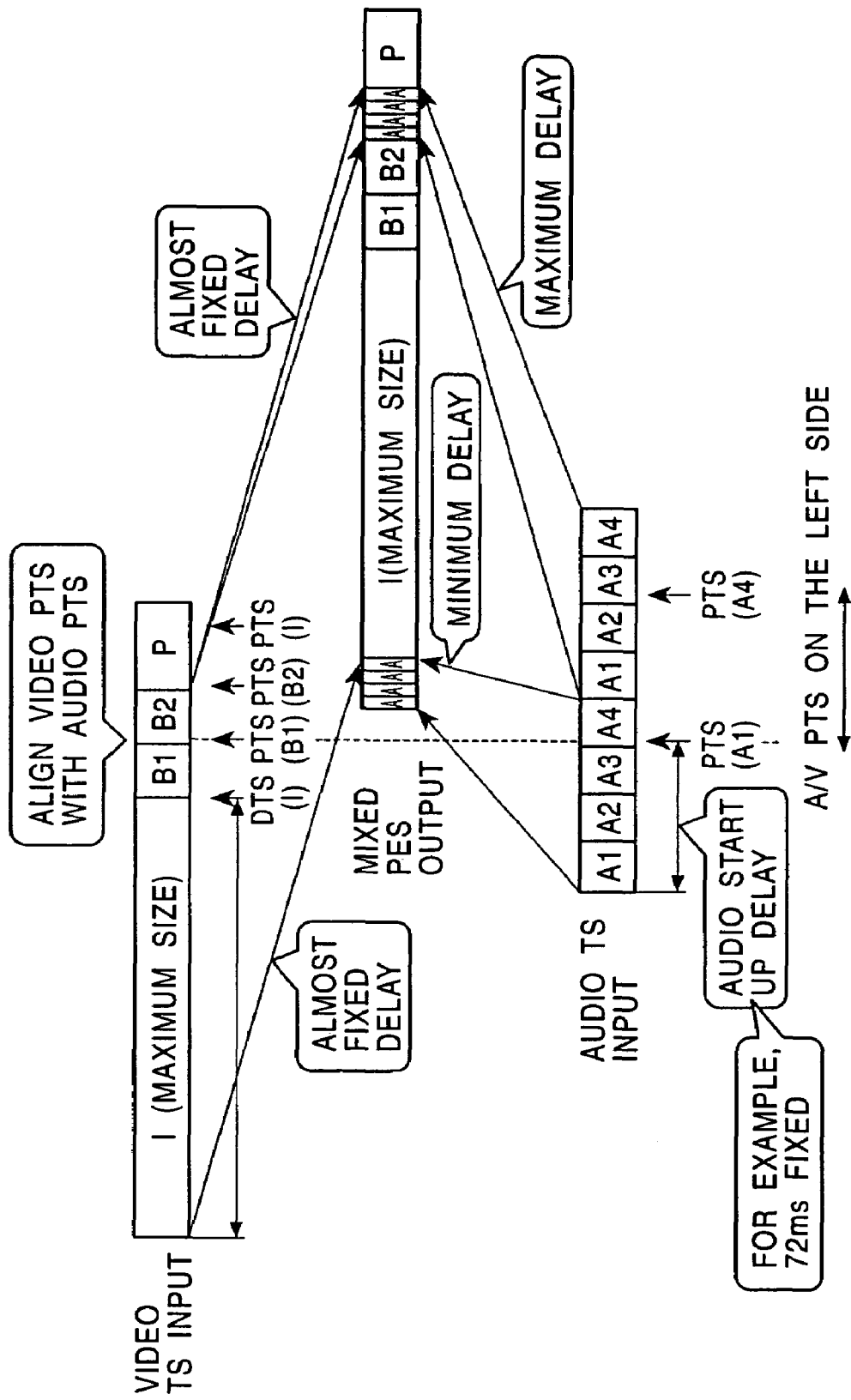
FIG. 17 illustrates a delay period created in the second recording processing.

The A/V mixer 5 selects three PES packets, i.e., an I picture, a B picture, and a B picture, or a P picture, a B picture, and a B picture, from the video PES packets received from the video PES conversion unit 2, and combines the three PES packets into an editing unit. The A/V mixer 5 also sets, as shown in FIG. 17, the earliest PTS time of the combined three frame images to PTS1, and the earliest PTS time of the subsequent three frame images to PTS2. Then, the A/V mixer 5 combines audio PES packets having a PTS after PTS1 and before PTS2 into an editing unit, and alternately and sequentially disposes the audio editing unit and the video editing unit, thereby generating a mixed PES. FIG. 17 illustrates a delay time before recording the input TS as a PES according to the second recording processing.

In step S12, the A/V mixer 5 generates an SB whose data type is AUX and whose AUX mode is AUX_V, and records the auxiliary information, such as copyright information, input from the video PES conversion unit 2 in the data area of the SB, and couples the SB to the audio PES packets.

In step S13, the A/V mixer 5 divides each of the video PES packets and the audio PES packets into 95-byte units, so that they can be disposed in the data areas of the SBs whose data type is PES_VIDEO or PES_AUDIO. As has been described with reference to FIG. 8, when the divided PES packet has 95 bytes and occupies the whole data area of the SB, the A/V mixer 5 records 0 in the full/partial flag of the SB header. In contrast, when the divided PES packet is short of 95 bytes and does not occupy the whole data area (95 bytes) of the SB, the A/V mixer 5 records the data length in the first byte of the header of the PES packet and also records 1 in the full/partial flag of the SB header.

In step S14, the A/V mixer 5 records the continuity counter value in the SB header of an SB whose data type is PES_VIDEO or PES_AUDIO, thereby completing the SB header. Then, the A/V mixer 5 adds the SB header to each 95-byte PES packet obtained in step S13, thereby generating the SBs. The generated SBs are then stored in a memory device, which is formed in interleave units and is built in the A/V mixer 5.

The A/V mixer 5 then generates SBs whose data type is SEARCH_DATA and in which search data is recorded, and SBs whose data type is AUX and whose AUX mode is SYSTEM and in which system auxiliary information is recorded. The generated SBs are stored in predetermined positions of the memory devices built in the A/V mixer 5.

If the generated SBs do not meet the recording rate of the magnetic tape 9, the A/V mixer 5 generates SBs whose data type is NULL. The generated SBs are stored in the memory device integrated in the A/V mixer 5.

If the occurrence of an error or the discontinuity of TS packets is reported from the demultiplexer 7 via the controller 16, the A/V mixer 5 records data in the following manner in steps 13 and 14. That is, if odd data before the occurrence of an error still remains, the A/V mixer 5 records data in an SB by turning on the partial flag, and starts recording data after the occurrence of an error in a new SB.

The A/V mixer 5 also effectively records a discontinuous value in the continuity counter of the new SB header so as to identify the position at which the error has occurred when a playback operation is performed.

In step S15, after generating a C2 parity for one track of SBs, the A/V mixer 5 adds a C1 parity to the end of each SB and starts outputting the SBs to the recording unit 6 in accordance with the SBs to be recorded on the magnetic tape 9.

In step S16, the recording unit 6 then randomizes the SBs sequentially received from the A/V mixer 5 according to the M sequence, as in the DV format used in conventional consumer digital VCRs. Subsequently, the recording unit 6 restricts the run length and superimposes the tracking frequencies according to 24-to-25 conversion, and records the randomized SBs on a magnetic tape 9.

Figure 18:
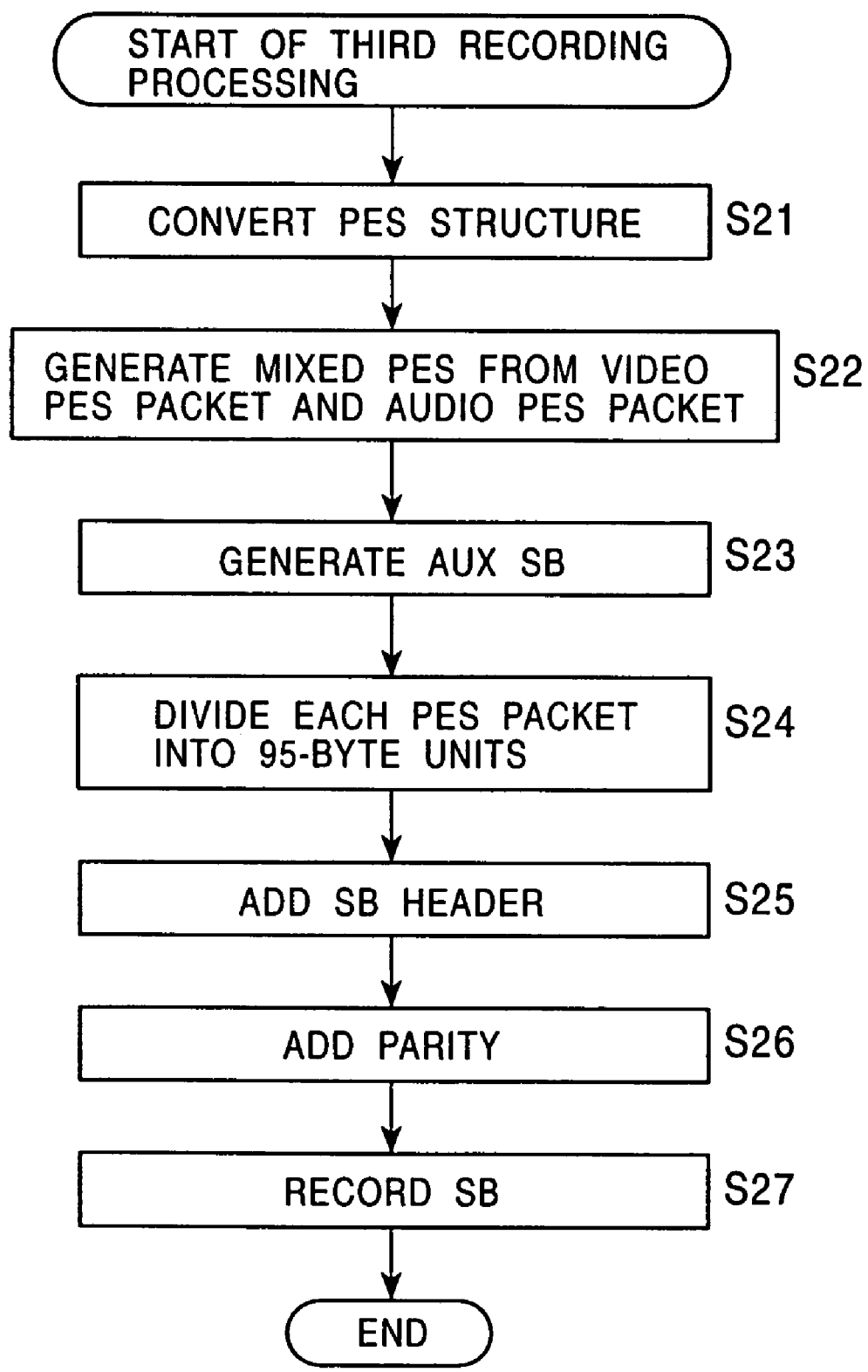
FIG. 18 is a flow chart illustrating the third recording processing.

A description of the third recording processing is given below with reference to the flow chart of FIG. 18. The third recording processing commences when it is determined based on information recorded in the descriptor of a PMT, which is input together with the TS into the demultiplexer 7, that the TS is a non-native and also satisfies the conditions (the TS is a single program and vbv_delay is added to the video ES) to which the third recording processing is applicable.

In step S21, the demultiplexer 7 separates an input TS into a video TS packet and an audio TS packet, and outputs them to the video PES conversion unit 2 and the audio PES conversion unit 4, respectively. In this case, the demultiplexer 7 detects the occurrence of an error or the discontinuity of TS packets based on the transport error indicator or the continuity counter, respectively, indicated in the header of the TS packets, and discards the corresponding TS packets. The demultiplexer 7 then reports the occurrence of an error or the discontinuity of TS packets to the A/V mixer 5 via the controller 16. The demultiplexer 7 also detects TS packets of the PSI from the TS and supplies them to the A/V mixer 5. Moreover, the demultiplexer 7 discards the PCR contained in the TS.

The video PES conversion unit 2 reconstructs the video PES packets from the video TS packets input from the demultiplexer 7, and determines whether each video PES packet is formed of one video frame. If not, the video PES conversion unit 2 converts the video PES packet into a video ES, and interpolates a PTS and a DTS so as to convert the video ES into a PES packet equivalent to a native PES packet formed of one frame. The resulting PES packet is then output to the A/V mixer 5. The video PES conversion unit 2 also extracts auxiliary information, such as copyright information, from the video TS packet, and outputs it to the A/V mixer 5.

Meanwhile, the audio PES conversion unit 4 reconstructs the audio PES packets from the audio TS packets input from the demultiplexer 7, and determines whether each audio PES packet is formed of one audio frame (AAU). If not, the audio PES conversion unit 4 converts the audio PES packet into an audio ES and interpolates a PTS so as to convert the ES packet into a PES packet equivalent to a native PES packet formed of one frame. The resulting PES packet is then output to the A/V mixer 5. The audio PES conversion unit 4 also extracts auxiliary information, such as copyright information, from the audio TS packets, and outputs it to the A/V mixer 5.

In step S22, the A/V mixer 5 selects three PES packets, i.e., an I picture, a B picture, and a B picture, or a P picture, a B picture, and a B picture, from the video PES packets received from the video PES conversion unit 2, and combines the three PES packets into an editing unit. The A/V mixer 5 also sets the earliest value of the PTS time of the three frame images to PTS1, and the earliest value of the PTS time of the subsequent three frame images to PTS2. Then, the A/V mixer 5 combines audio PES packets having a PTS after PTS1 and before PTS2 into an editing unit, and alternately and sequentially disposes the audio editing unit and the video editing unit, thereby generating a mixed PES.

In step S23, the A/V mixer 5 generates an SB whose data type is AUX and whose AUX mode is AUX_V, and records the auxiliary information, such as copyright information, input from the video PES conversion unit 2 in the data area of the SB, thereby coupling the SB to the video PES packet. The A/V mixer 5 also generates an SB whose data type is AUX and whose AUX mode is AUX_A, and records the auxiliary information, such as copyright information, input from the audio PES conversion unit 4, in the data area of the SB, thereby coupling the SB to the audio PES packets. Moreover, the A/V mixer 5 generates SBs whose data type is AUX and whose AUX mode is PSI-1 or PSI-2, and records the first half of the TS packet of the PSI received from the demultiplexer 7 in the data area of the PSI-1 SB, and the second half of the TS packet of the PSI in the data area of the PSI-2 SB.

In step S24, the A/V mixer 5 divides each of the video PES packets and the audio PES packets into 95-byte units so that they can be disposed in the data areas of the SBs whose data type is PES_VIDEO or PES_AUDIO. As has been described with reference to FIG. 8, when the divided PES packet has 95 bytes and occupies the whole data area of the SB, the A/V mixer 5 records 0 in the full/partial flag of the SB header. In contrast, when the divided PES packet is short of 95 bytes and does not occupy the whole data area (95 bytes) of the SB, the A/V mixer 5 records the data length in the first byte of the head of the PES packet and also records 1 in the full/partial flag of the SB header.

In step S25, the A/V mixer 5 records the continuity counter value in the SB header of an SB whose data type is PES_VIDEO or PES_AUDIO, thereby completing the SB header. Then, the A/V mixer 5 adds the SB header to each 95-byte PES packet obtained in step S24, thereby generating the SBs. The generated SBs are then stored in a memory device, which is formed in interleave units and is built in the A/V mixer 5.

The A/V mixer 5 then generates SBs whose data type is SEARCH_DATA and in which search data is recorded, and SBs whose data type is AUX and whose AUX mode is SYSTEM. The generated SBs are stored in predetermined positions of the memory devices integrated in the A/V mixer 5.

If the generated SBs do not meet the recording rate of the magnetic tape 9, the A/V mixer 5 generates SBs whose data type is NULL. The generated SBs are stored in the memory device integrated in the A/V mixer 5.

If the occurrence of an error or the discontinuity of TS packets is reported from the demultiplexer 7 via the controller 16, the A/V mixer 5 records data in the following manner in steps 24 and 25. That is, if odd data before the occurrence of an error still remains, the A/V mixer 5 records data in an SB by turning on the partial flag, and starts recording data after the occurrence of an error in a new SB. The A/V mixer 5 also effectively records a discontinuous value in the continuity counter of the new SB header so as to identify the position at which the error has occurred when a playback operation is performed.

In step S26, after generating a C2 parity for one track of SBs, the A/V mixer 5 adds a C1 parity to the end of each SB, and starts outputting the SBs to the recording unit 6 in accordance with the order of the SBs to be recorded on the magnetic tape 9.

In step S27, the recording unit 6 then randomizes the SBs sequentially received from the A/V mixer 5 according to the M sequence, as in the DV format used in conventional consumer digital VCRs. Subsequently, the recording unit 6 restricts the run length and superimposes the tracking frequencies according to 24-to-25 conversion, and records the randomized SBs on the magnetic tape 9.

Figure 19:
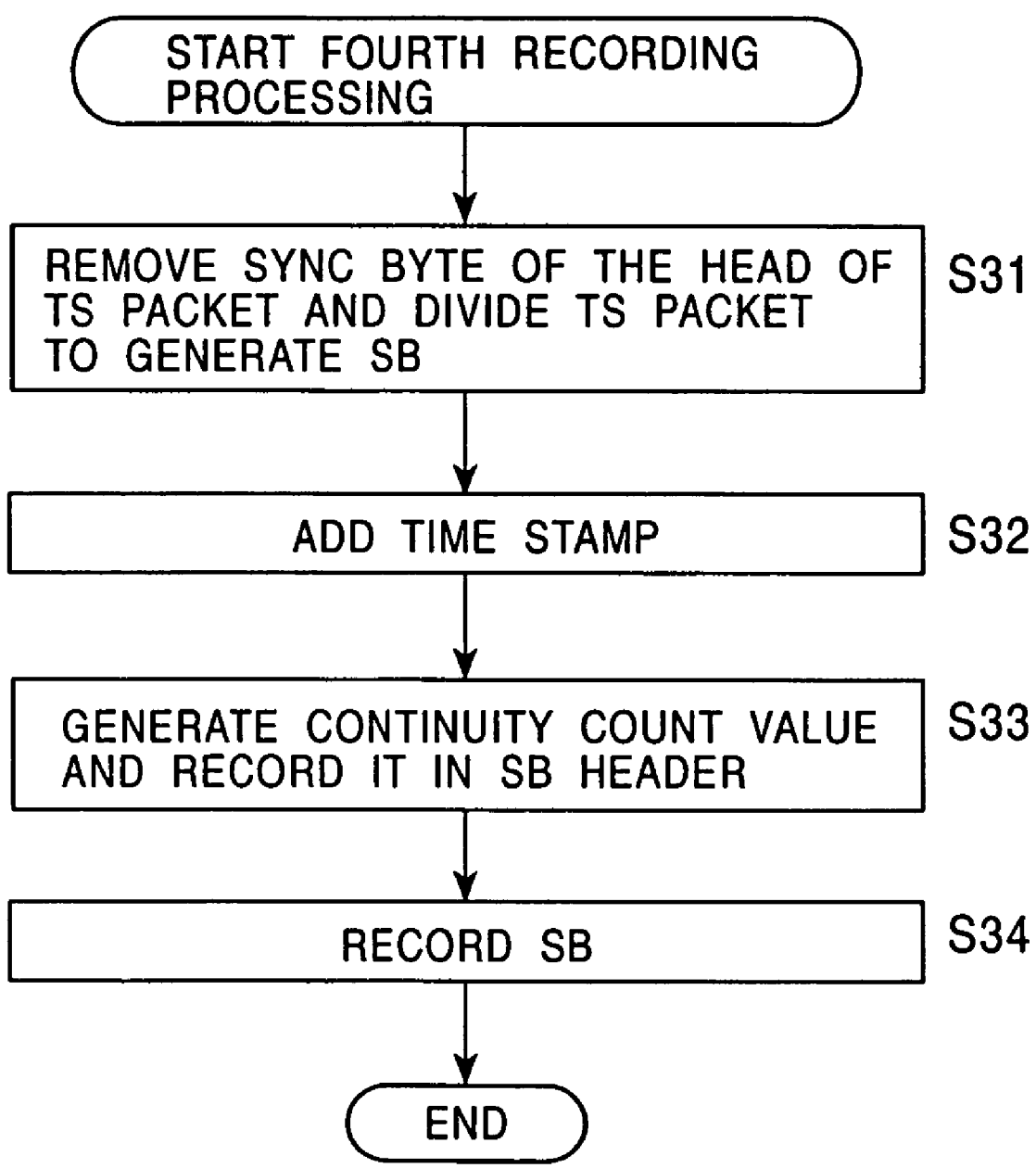
FIG. 19 is a flow chart illustrating the fourth recording processing.

The fourth recording processing is now described with reference to the flow chart of FIG. 19. The fourth recording processing begins when it is determined based on information recorded in the descriptor of a PMT, which is input together with the TS into the demultiplexer 7, that the TS is non-native and does not satisfy the condition under which the third recording processing is applicable (i.e., when it is determined that the TS is not a single program or vbv_delay is not added to the video ES).

In step S31, the demultiplexer 7 separates an input non-native TS into the individual TS packets, and outputs them to the A/V mixer 5. The A/V mixer 5 removes the first sync byte from the input TS packet, and then divides the TS packet into the first half of 92 bytes and the second half of 95 bytes. Subsequently, the A/V mixer 5 records the first half of 92 bytes in the data area of an SB whose data type is TS-1, and the second half of 95 bytes in the data area of an SB whose data type is TS-2.

In step S32, the A/V mixer 5 adds a time stamp indicating the arrival time to 27 bits which consist of the three LSBs of the SB header whose data type is TS-1 generated in step S31 and the three bytes of the head of the data area.

In step S33, the A/V mixer 5 records the continuity count value representing the continuity of the TS packets in the five LSBs of the SB header whose data type is TS-2 generated in step S31. The generated SBs are stored in a memory device integrated in the A/V mixer 5. The TS-1 SB and the associated TS-2 SB are disposed so that they are in the closest proximity with each other. Even if the occurrence of an error or the discontinuity of TS packets is detected, the TS packets are recorded in the SBs.

The A/V mixer 5 also creates SBs whose data type is SEARCH_DATA and in which search data is recorded and SBs whose data type is AUX and whose AUX mode is SYSTEM and in which system auxiliary information is recorded. The created SBs are stored at predetermined positions of the memory device integrated in the A/V mixer 5.

When the generated SBs do not meet the recording rate of the magnetic tape 9, the A/V mixer 5 generates SBs whose data type is NULL. The generated SBs are stored in the memory device built in the A/V mixer 5.

In step S34, the A/V mixer 5 outputs the SBs to the recording unit 6 in accordance with the order of the SBs to be recorded on the magnetic tape 9. The recording unit 6 then randomizes the SBs sequentially received from the A/V mixer 5 according to the M sequence, as in the DV format used in conventional consumer digital VCRs. Subsequently, the recording unit 6 restricts the run length and superimposes the tracking frequencies according to 24-to-25 conversion, and records the randomized SBs on the magnetic tape 9.

A description is given below of the playback processing performed by the A/V recording/playback apparatus of the present invention. The A/V recording/playback apparatus performs normal playback processing, such as reading and decoding the PESs or the TSs recorded on the magnetic tape 9 by one of the above-described four types of recording processing, and then outputting the resulting video signals and audio signals. The A/V recording/playback apparatus also reads the PESs recorded on the magnetic tape 9 and converts them to TSs, and outputs the TS.

Figure 20:
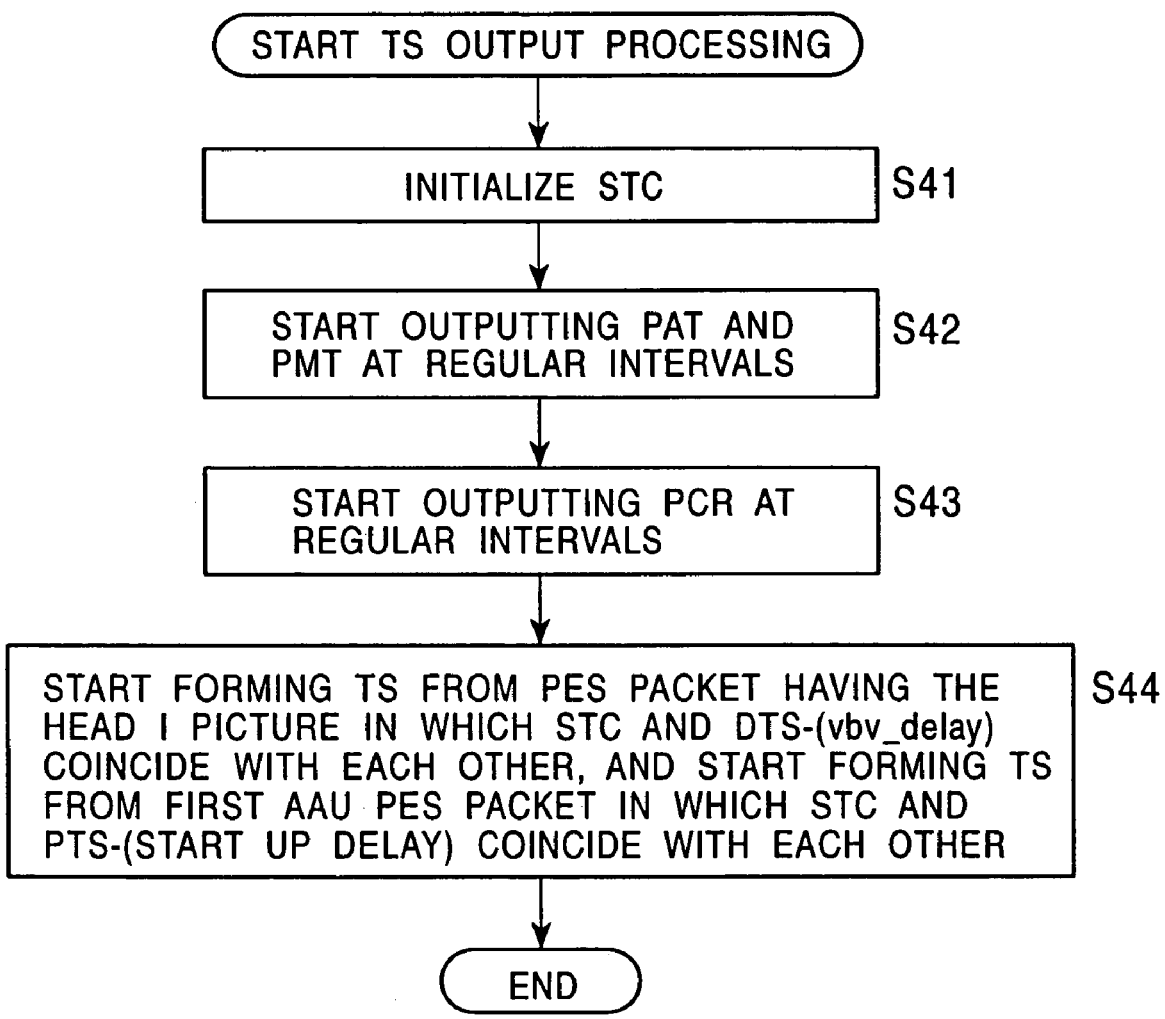
FIG. 20 is a flow chart illustrating the TS output processing.
Figure 21:
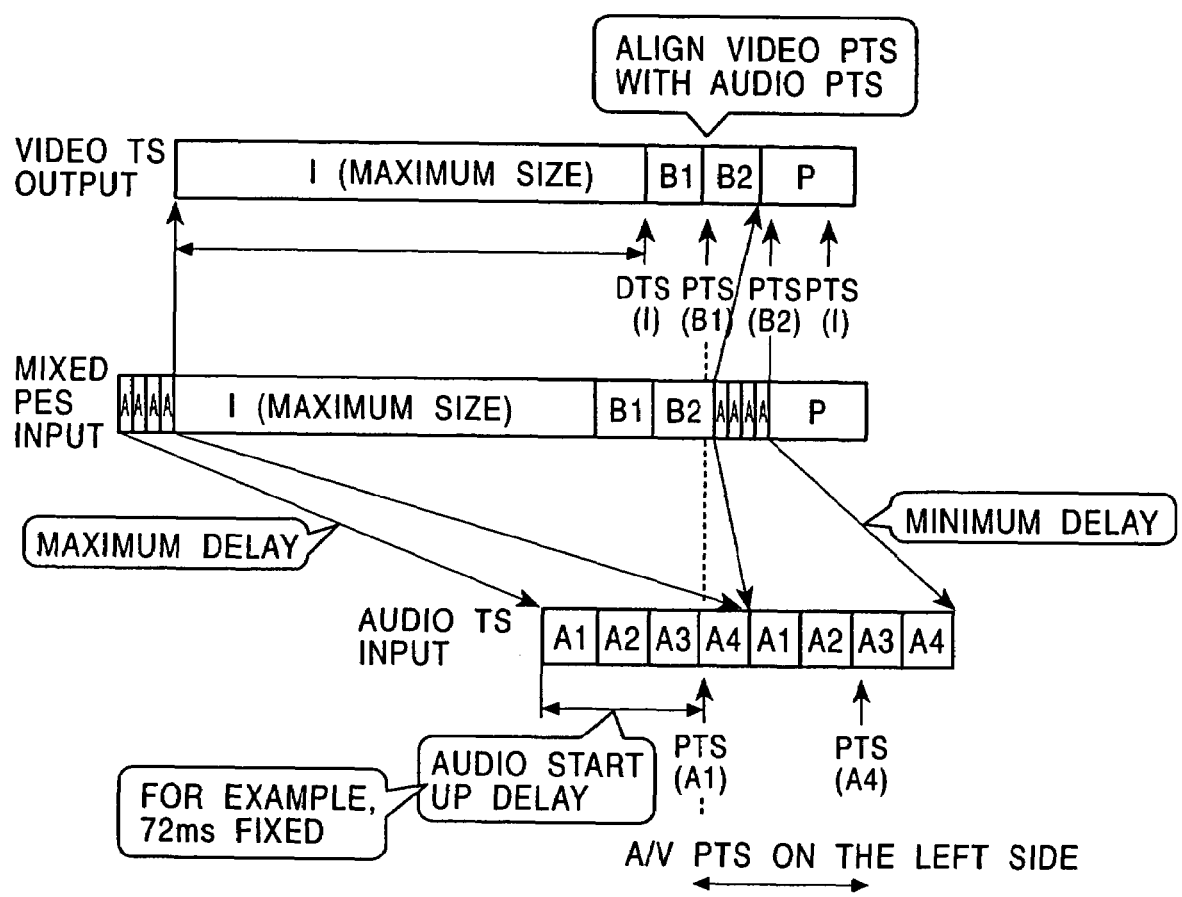
FIG. 21 illustrates a delay period created in the TS output processing.

The TS output processing executed by the A/V recording/playback apparatus is discussed below with reference to the flow chart of FIG. 20 and the diagram of FIG. 22. The TS output processing starts when the supply of PES packets (including error corrections based on parity data), which are reconstructed from the SBs sequentially read from the magnetic tape 9 by the playback unit 10, to the TS conversion unit 14 begins, and also when a PES packet of an I picture is detected. A delay period created before outputting the read PESs as TSs is shown in FIG. 21.

In step S41 (corresponding to processing 1 in FIG. 22), the TS conversion unit 14 reads the DTS from the PES header of an I picture and also reads vbv_delay from the picture header so as to calculate DTS-(vbv_delay). The TS conversion unit 14 then subtracts a predetermined period from DTS-(vbv_delay) so as to initialize a system time clock (STC), and starts a STC counter.

In step S42 (corresponding to processing 2 in FIG. 22), the TS conversion unit 14 generates PSI packets of a program association table (PAT) and a PMT and outputs them at regular intervals. Accordingly, at the receiving side of the TS, the PAT and the PMT can be received before the video and audio TS packets, thereby preventing the header GOP from missing.

In step S43 (corresponding to processing 3 in FIG. 22), the TS conversion unit 14 outputs PCR packets which store the STC values at certain intervals.

In step S44 (corresponding to processing 4 in FIG. 22), the TS conversion unit 14 start converting the video PES packet into TSs and outputting them by synchronizing the time (DTS-(vbv_delay)) obtained by subtracting vbv_delay from the DTS of the first I picture with the STC. The same applies to the other pictures. Since the DTS is not recorded in the B pictures, the PTS is used, and the processing is similarly performed.

Figure 22:
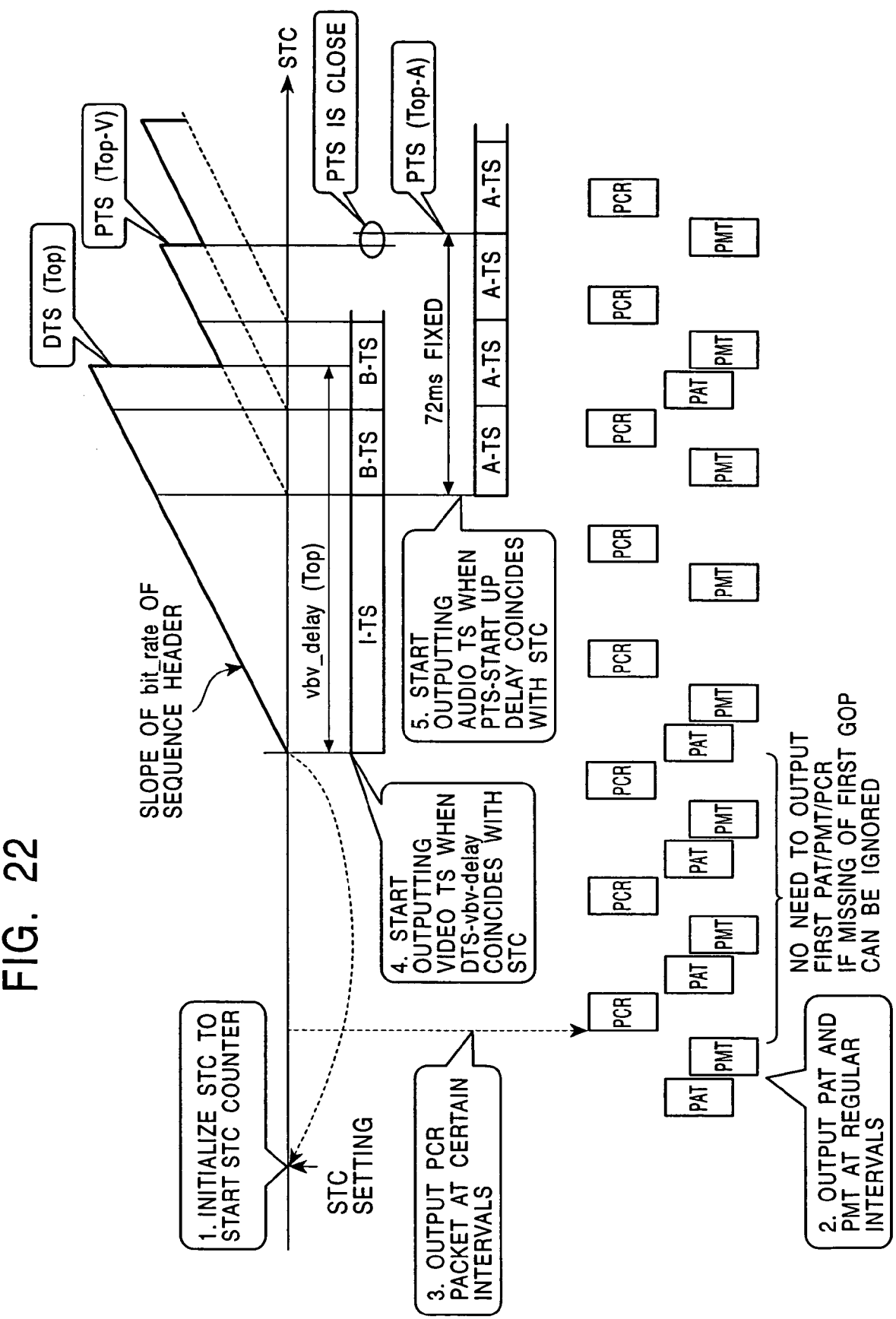
FIG. 22 illustrates the TS output processing.

The TS conversion unit 14 also starts converting audio PES packets into TSs and outputting them by synchronizing the time obtained by subtracting the start up delay from the PTS of the first frame (AAU) with the STC (corresponding to processing 5 in FIG. 22). It is necessary that the audio output rate be exactly the same as the value recorded in the bit rate index (bitrate_index) of the header.

The A/V recording/playback apparatus may also output the TSs recorded on the magnetic tape 9 as the TSs.

In relation to the TS output processing of the TS conversion unit 14, the output interval of the video TS packets, the handling of the auxiliary (AUX) data, the output processing of non-native TSs recorded on the magnetic tape 9, error handling in the PES recording, and error handling in the TS recording are discussed below.

The output interval of the video TS packets are as follows. When a value other than 0xFFFF is recorded as vbv_delay in the picture header of a PES which is read from the magnetic tape 9, and when the bit rate (bit_rate) value of the sequence header coincides with the output rate, it can be concluded that the PES is native. In this case, the PES is converted into a TS at a rate slightly higher than the above-described bit rate, and when the PESs of the picture are completely converted into TSs, the TS conversion unit 14 waits until the data of the subsequent picture is input.

On the other hand, when vbv_delay is not added to the picture header of the PES read from the magnetic tape 9 (i.e., when 0xFFFF is recorded), or when the bit rate (bit_rate) of the sequence header does not coincide with the output rate, it can be concluded that the PES is non-native. In this case, the interval from one picture to the subsequent picture (DTS-(vbv_delay) is divided by the number of bits of the former picture, and the TS conversion unit 14 outputs the TSs at intervals of the resulting value.

The handling of the AUX data is as follows. When the PESs read from the magnetic tape 9 are native, the AUX data is recorded in SBs whose data type is AUX_V or AUX_A according to the above-described first or second recording processing. Accordingly, in the TS output processing, the AUX data recorded in an AUX_V SB or an AUX_A SB is directly carried on the TS packets, and the TS packets are output. It should be noted that the AUX_V data is coupled to the video PES, and the AUX_A data is coupled to the audio PES. Thus, the AUX data is converted into a TS in synchronization with the video PES or the audio PES, and the TS is then output.

The PMT which is specially used for native data is created. In the PMT, PIDs of video data, audio data, AUX data, and a PCR are recorded. Copyright information, which is part of the AUX data, is recorded in the PMT so that it can be identified even in general-purpose machines. The descriptor, which indicates that the PES is native, is also recorded in the PMT.

When the PES read from the magnetic tape 9 is non-native, the PAT, PMT, and SIT, which form the AUX data, are recorded in the SBs whose data type is AUX and whose AUX mode is PSI-1 or PSI-2. Accordingly, the PES is simply returned to the TS packet, and the TS packet is output. When returning the PES to the TS packet, the values recorded in the PMT are used as the PIDs of the video data, the audio data, and the PCR, thereby eliminating the need for overwriting the PMT and the cyclic redundancy check (CRC) value.

A description is given below of the output processing of non-native TSs recorded on the magnetic tape 9. Since a time stamp is recorded in the TSs recorded on the magnetic tape 9 by the aforementioned fourth recording processing, the TSs are output when the time stamp coincides with the STC during a playback operation. The sync byte has been removed from the TS header read from the magnetic tape 9 according to the fourth recording processing. Accordingly, the sync byte is added to the TS header, and the TS is then output.

Figure 23:
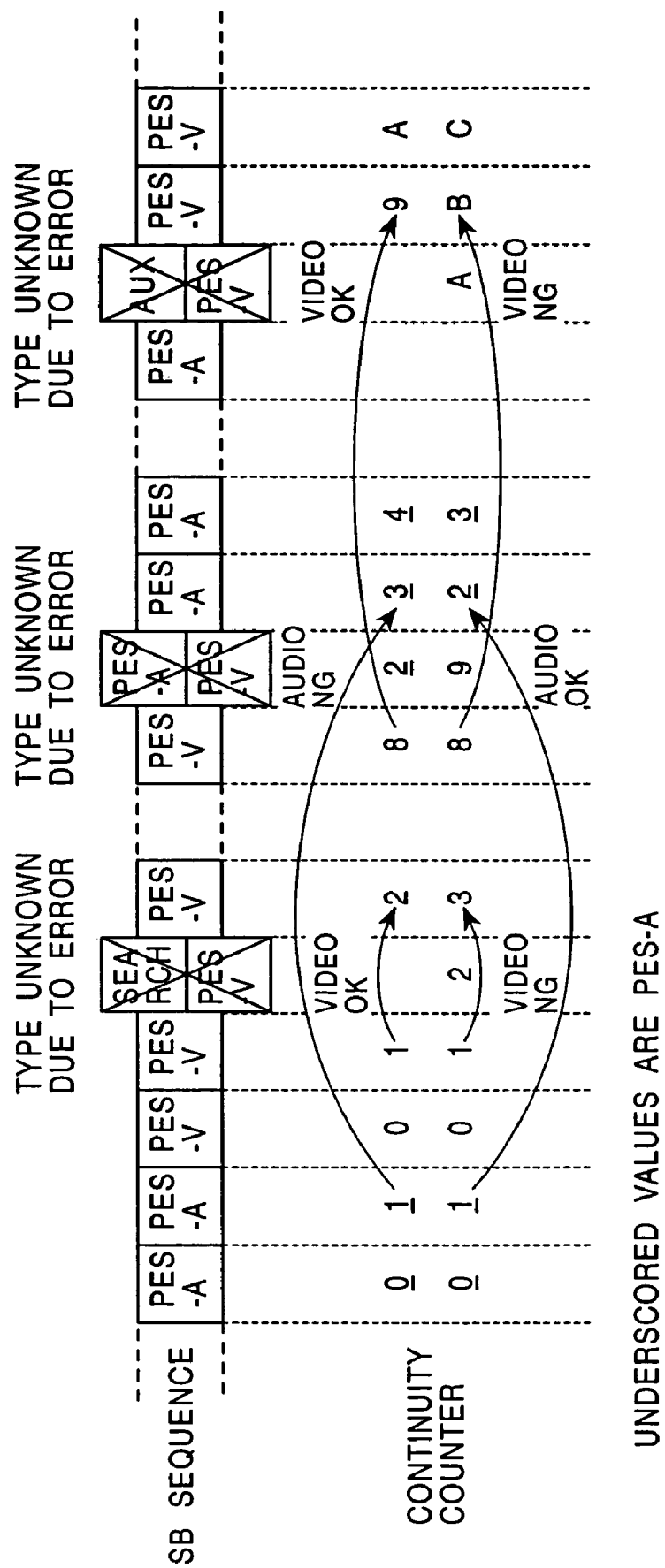
FIG. 23 illustrates error handling performed during PES recording.

Error handling of data recorded as PESs based on the continuity counter of the SB header is described below with reference to FIG. 23. The data type of an SB is recorded in the SB header according to one of the first, second, and third recording processing. Accordingly, in case of the occurrence of an uncorrectable error in the SB, the data type becomes unknown.

Thus, based on the continuity of the values of the continuity counter recorded in the SB header of an SB without an error, the data type of the SB having an uncorrectable error is determined.

More specifically, the values of the continuity counters of the SBs whose data type is PES-VIDEO are monitored, and when the discontinuity of the values of the continuity counters of the SBs before and after an SB having an uncorrectable error is detected, it can be proved that the data type of the SB having an error is PES-VIDEO. Similarly, the values of the continuity counters of the SBs whose data type is PES-AUDIO are monitored, and when the discontinuity of the values of the continuity counters of the SBs before and after an SB having an error is detected, it can be proved that the data type of the SB having an uncorrectable error is PES-AUDIO.

Accordingly, it can be determined whether an error has occurred in an SB in which a PES is recorded. It is thus possible to reduce an adverse influence on the read video and audio data caused by the occurrence of an error.

Even when an error has occurred at the boundary between a PES-VIDEO SB and a PES-AUDIO SB, the continuity between the value of the continuity counter of the SB after the SB having an error and that of the last continuity counter of the previous coupling unit can be checked, thereby detecting the occurrence of an error.

When the values of the continuity counters are continuous, the TSs are continuously output. In contrast, when the values of the continuity counters are not continuous, and when the error is uncorrectable, an error code is inserted. For inserting the error code in the ES layer, 0x000001B4 of a sequence error code can be inserted. For the TS layer, a packet in which 1 is set can be output to the transport error indicator (transport_error_indicator).

The continuity counter value has four cyclic bits from 0 to 15. Accordingly, if SBs of the same data type are missing consecutively for a multiple number of 16, the continuity counter is unable to detect the error. Thus, if 16 or more SBs having an uncorrectable error are continuous, an error code is inserted regardless of the data type of SBs.

If error handling is executed even if an uncorrectable error does not occur in SBs, a discontinuous value of the continuity counter effectively recorded during a recording operation can be handled as an error.

A description is now given, with reference to FIG. 24, of the error handling of data recorded in TSs based on the continuity counter of the SB header. The data type of an SB is recorded in the SB header according to the fourth recording processing. Accordingly, in case of the occurrence of an uncorrectable error, the data type of an SB becomes unknown.

Thus, based on the continuity of the value of the continuity counter recorded in the SB header of an SB without an error, the data type of an SB having an uncorrectable error is detected.

More specifically, the data types of SBs without an error before and after an uncorrectable SB are monitored. If the data types of SBs are sequentially from TS-1 to TS-2, the continuity between the value of the continuity counter recorded in the SB header of the TS-2 SB and that of the previous TS-2 SB is checked. If the two values are continuous, the TS-1 SB and the TS-2 SB are found to be a pair, and they are reconstructed into one TS packet. In contrast, if the two values are not continuous, the TS-1 SB and the TS-2 SB are not a pair, and both of them are discarded since the pairs thereof are missing.

The playback system is able to detect that the TSs have been discarded based on the values of the continuity counter recorded in the TS headers of the TSs before and after the discarded TSs. It is thus possible to reduce an adverse influence of an error on the read video and audio data.

If the data types of SBs are sequentially from TS-2 to TS-1, the corresponding SBs are output without performing error handling. That is, even if the data type of an uncorrectable SB is TS-1 or TS-2, the playback system is able to identify the occurrence of an error based on the discontinuity of the value of the continuity counter of the TS header.

If the data types are sequentially from TS-1 to TS-1, the previously read TS-1 SB is discarded. This can be identified by the playback system based on the discontinuity of the value of the continuity counter of the TS header.

If the data types are sequential from TS-2 to TS-2 , the TS-2 SB which has been read later is discarded. This can be identified by the playback system based on the discontinuity of the value of the continuity counter of the TS header.

As is seen from the foregoing description, the AV recording/playback apparatus of the present invention offers the following advantages.

In recording video signals and audio signals in the form of ESs, the overhead of the recording rate can be minimized. In recording video signals and audio signals in the form of PESs, PESs can easily be converted into TSs. According to the ES or PES recording, processing required for jog playback is reduced, and it is not necessary to record a TS header and a time stamp indicating the TS arrival time. Accordingly, the overhead can be reduced. Hence, space can be saved on a recording medium, or the recording time becomes longer. Additionally, since a PCR is not recorded, the overhead can be reduced, and space can also be saved, or the recording time becomes longer.

Since one video frame forms one PES packet, a PTS is provided for all the frames. Accordingly, the timing can easily be provided to convert PESs into TSs. The implementation of joy playback is also facilitated. Since one audio frame forms one PES packet, a PTS is provided for all the frames. Accordingly, the timing can easily be provided to convert PESs into TSs. Additionally, in performing editing, audio data can easily be divided, and not only native audio data, but also non-native audio data can be edited. Although the data type is conventionally identified by the PID, it can be represented by the ID code having a smaller number of bits than the PID. The overhead can thus be reduced.

When the whole data area of an SB is occupied with effective data, it is not necessary to record a byte indicating the data length, thereby making the overhead smaller. When a PSI section is divided into a plurality of TS packets, the head of the TS packet can be indicated by the payload unit start indicator of the TS packet header. Thus, the PSI can be stored in two SBs whose data type is AUX.

Since the output of TSs is started from DTS-(vbv_delay), timing can be provided without requiring the arrival time. TSs are output at a rate slightly higher than the recorded bit rate (bit_rate), thereby preventing TSs from interfering with each other at the boundary of frames. By outputting TSs at regular intervals, they can be output at an average rate even if the recorded bit_rate is much higher than the actual rate. Since the PCR is output before the first frame, the playback system is able to load the PCR in the STC, and then receives the first frame. Accordingly, the head of the read data can be displayed without missing. Since the PAT and the PMT are output before the PCR packet, the playback system is able to receive the whole PCR packets. The position at which an error has occurred can be identified, thereby reducing an adverse influence of the error on the image quality or the sound quality. The occurrence of an error detected during the recording operation can be reported to the playback system without increasing the number of bits.

The present invention is also applicable when AV signals are recorded on information recording media other than magnetic tape.

The above-described series of processing may be executed by hardware or software. If software is used, it is installed from a recording medium into a computer which contains special hardware integrating the corresponding software program or into a computer, for example, a general-purpose computer, which executes various functions by installing various programs.

Such a recording medium may be formed of a package medium, as shown in FIG. 1, which is distributed to the user separately from the computer, such as a magnetic disk 18 (including a floppy disc), an optical disc 19 (including compact disc read only memory (CD-ROM) and a digital versatile disk (DVD)), a magneto-optical disk 20 (including an mini disk (MD)), or a semiconductor memory 21. The recording medium may also be formed of a ROM or a hard disk on which the program is recorded, which can be provided to the user while being installed in the computer.

It is not essential that the steps forming the program recorded on a recording medium be executed chronologically according to the order discussed in this specification. Alternatively, they may be executed concurrently or individually.

The term, "system", used in this specification represents the overall apparatus formed of a plurality of devices.

What is claimed is:

1. A playback apparatus for converting an audio signal and a video signal recorded on an information recording medium as packetized elementary stream packets into a transport stream, comprising:

reading means for reading the packetized elementary stream packets from said information recording medium;

initializing means for initializing a system time clock by using one of a decoding time stamp and a presentation time stamp included in a header of each of the packetized elementary stream packets;

first generation means for generating a program clock reference packet by using a value of the system time clock which is read at predetermined intervals; and conversion means for converting the packetized elementary stream packets into transport stream packets while synchronizing a time obtained by delaying the system time clock by a predetermined period with a time indicating the decoding time stamp or the presentation time stamp included in the header of each of the packetized elementary stream packets, wherein the conversion means reads the decoding time stamp from the header of an I picture and also reads vbv_delay from the header and calculates DTS-(vbv_delay), wherein the conversion means then subtracts a predetermined period from DTS-(vbv_delay) initializing the system time clock and starting a system time clock counter;

wherein said conversion means converts the packetized elementary stream packets of the video signal into the transport stream packets at a fixed rate, and intermittently outputs the transport stream packets.

2. A playback apparatus for converting an audio signal and a video signal recorded on an information recording medium as packetized elementary stream packets into a transport stream, comprising:

reading means for reading the packetized elementary stream packets from said information recording medium;

initializing means for initializing a system time clock by using one of a decoding time stamp and a presentation time stamp included in a header of each of the packetized elementary stream packets;

first generation means for generating a program clock reference packet by using a value of the system time clock which is read at predetermined intervals; and conversion means for converting the packetized elementary stream packets into transport stream packets while synchronizing a time obtained by delaying the system time clock by a predetermined period with a time indicating the decoding time stamp or the presentation time stamp included in the header of each of the packetized elementary stream packets, wherein the conversion means reads the decoding time stamp from the header of an I picture and also reads vbv_delay from the header and calculates DTS-(vbv_delay), wherein the conversion means then subtracts a predetermined period from DTS-(vbv_delay) initializing the system timeclock and starting a system time clock counter;

wherein said conversion means converts the packetized elementary stream packets of the video signal into the tranport stream packets at a variable rate, and outputs the transports stream packets at regular intervals.

3. A playback method for converting an audio signal and a video signal into a transport stream, the method comprising:

reading one or more packetized elementary stream packets from an information recording medium;

initializing a system time clock by using one of a decoding time stamp and a presentation time stamp included in a header of each of the packetized elementary stream packets;

generating a program clock reference packet by using a value of the system time clock which is read at predetermined intervals; and converting the packetized elementary stream packets into transport stream packets while synchronizing a time obtained by delaying the system time clock by a predetermined period with a time indicating the decoding time stamp or the presentation time stamp included in the header of each of the packetized elementary stream packets;

reading the decoding time stamp from the header of an I picture;

reading vbv_delay from the header;

calculating DTS-(vbv_delay);

subtracting a predetermined period from DTS-(vbv_delay);

initializing the system time clock;

starting a system time clock counter;

converting the packetized elementary stream packets of the video signal into the transport stream packets at a fixed rate; and intermittently outputting the transport stream packets.

4. A playback method for converting an audio signal and a video signal recorded on an information recording medium as packetized elementary stream packets into a transport stream, the method comprising:

reading the packetized elementary stream packets from said information recording medium;

initializing a system time clock by using one of a decoding time stamp and a presentation time stamp included in a header of each of the packetized elementary stream packets;

generating a program clock reference packet by using a value of the system time clock which is read at predetermined intervals;

converting the packetized elementary stream packets into transport stream packets while synchronizing a time obtained by delaying the system time clock by a predetermined period with a time indicating the decoding time stamp or the presentation time stamp included in the header of each of the packetized elementary stream packets;

reading the decoding time stamp from the header of an I picture;

reading vbv_delay from the header;

calculating a DTS-(vbv_delay);

subtracting a predetermined period from DTS-(vbv_delay);

initializing the system time clock;

starting a system time clock counter;

converting the packetized elementary stream packets of the video signal into the transport stream packets at a variable rate; and outputting the transports stream packets at regular intervals.

* * * * *